(12) United States Patent
Weber et al.

(10) Patent No.: US 8,768,504 B2
(45) Date of Patent: Jul. 1, 2014

(54) METHOD AND SYSTEM FOR OPERATING AN INJECTION MOLDING MACHINE

(75) Inventors: Robert Bruce Weber, Brampton (CA); Joachim Johannes Niewels, Thornton (CA); Bruno Giuseppe Sodaro, Alton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 79 days.

(21) Appl. No.: 13/503,673

(22) PCT Filed: Sep. 1, 2010

(86) PCT No.: PCT/CA2010/001326
§ 371 (c)(1),
(2), (4) Date: Apr. 24, 2012

(87) PCT Pub. No.: WO2011/054080
PCT Pub. Date: May 12, 2011

(65) Prior Publication Data
US 2012/0219651 A1     Aug. 30, 2012

Related U.S. Application Data

(60) Provisional application No. 61/257,505, filed on Nov. 3, 2009.

(51) Int. Cl.
*G06F 19/00* (2011.01)
(52) U.S. Cl.
USPC ....................................................... 700/203
(58) Field of Classification Search
CPC ........ G05B 19/237; B29C 45/76; B22F 7/004
USPC ........... 700/203; 264/255, 513; 425/136, 145; 318/560, 271
See application file for complete search history.

(56) References Cited

U.S. PATENT DOCUMENTS 4,131,596 A   12/1978   Allen
4,522,778 A    6/1985   Baciu et al.
(Continued)

FOREIGN PATENT DOCUMENTS

DE   102008033571 A1   1/2010
EP       0369009 A1   5/1990
(Continued)

OTHER PUBLICATIONS

PCT International Search Report, Branka Ristovski, Dec. 10, 2010, 4 pages.

*Primary Examiner* — Kidest Bahta
(74) *Attorney, Agent, or Firm* — Husky Intellectual Property Services

(57) ABSTRACT

According to embodiments of the present invention, there is provided a method and system for operating an injection molding machine. For example, a molding system (100) to manufacture a molded article (103) in a mold-cavity system (200) by using a molding material (101) is provided. The system (100) including pressure-control system (126) coupled with the system (200); and controller (160) operatively coupling to system (126), controller (160) having controller-usable memory (162) tangibly embodying set of controller-executable instructions (500) to direct controller (160), including mold-unpack instructions (520), including instructing controller (160) to control system (126) to reduce, after solidification, at least in part, of material (101) being located in a nub region (214) of system (200), internal pressure of material (101) received in system (200) while system (200) remains isolated from stream of flowable-molding material, beyond any reduction of internal pressure in material (101) resulting from cooling of material (101), so that reduction in internal pressure of material (101) is enough to permit safe opening of system (200) while permitting safe extraction of article (103).

9 Claims, 17 Drawing Sheets

(56) References Cited

U.S. PATENT DOCUMENTS

| | | | |
|---|---|---|---|
| 4,816,197 A | 3/1989 | Nunn | |
| 4,820,462 A * | 4/1989 | Nakajima et al. | 264/669 |
| 4,913,638 A * | 4/1990 | Buja | 425/140 |
| 5,182,716 A * | 1/1993 | Stroud et al. | 700/203 |
| 5,213,726 A * | 5/1993 | Ramsey et al. | 264/40.5 |
| 5,439,371 A | 8/1995 | Sawaya | |
| 5,662,856 A | 9/1997 | Wunderlich | |
| 6,312,628 B1 * | 11/2001 | Wieder et al. | 264/37.27 |
| 6,649,095 B2 * | 11/2003 | Buja | 264/40.6 |
| 6,887,418 B2 | 5/2005 | Olaru et al. | |
| 7,293,981 B2 | 11/2007 | Niewels | |
| 2006/0051451 A1 | 3/2006 | Hutchinson et al. | |
| 2006/0131788 A1 | 6/2006 | Takigawa | |
| 2007/0207236 A1 | 9/2007 | Chiu | |
| 2008/0026239 A1 | 1/2008 | Balboni et al. | |
| 2011/0235339 A1 * | 9/2011 | Shyu et al. | 362/326 |

FOREIGN PATENT DOCUMENTS

| | | |
|---|---|---|
| EP | 0244783 B1 | 2/1991 |
| EP | 0593308 A1 | 4/1994 |
| EP | 0597108 A1 | 5/1994 |
| EP | 0425060 B1 | 8/1995 |
| EP | 1343621 B1 | 8/2005 |
| WO | 9825751 A1 | 6/1998 |
| WO | 2007039766 A1 | 4/2007 |

* cited by examiner

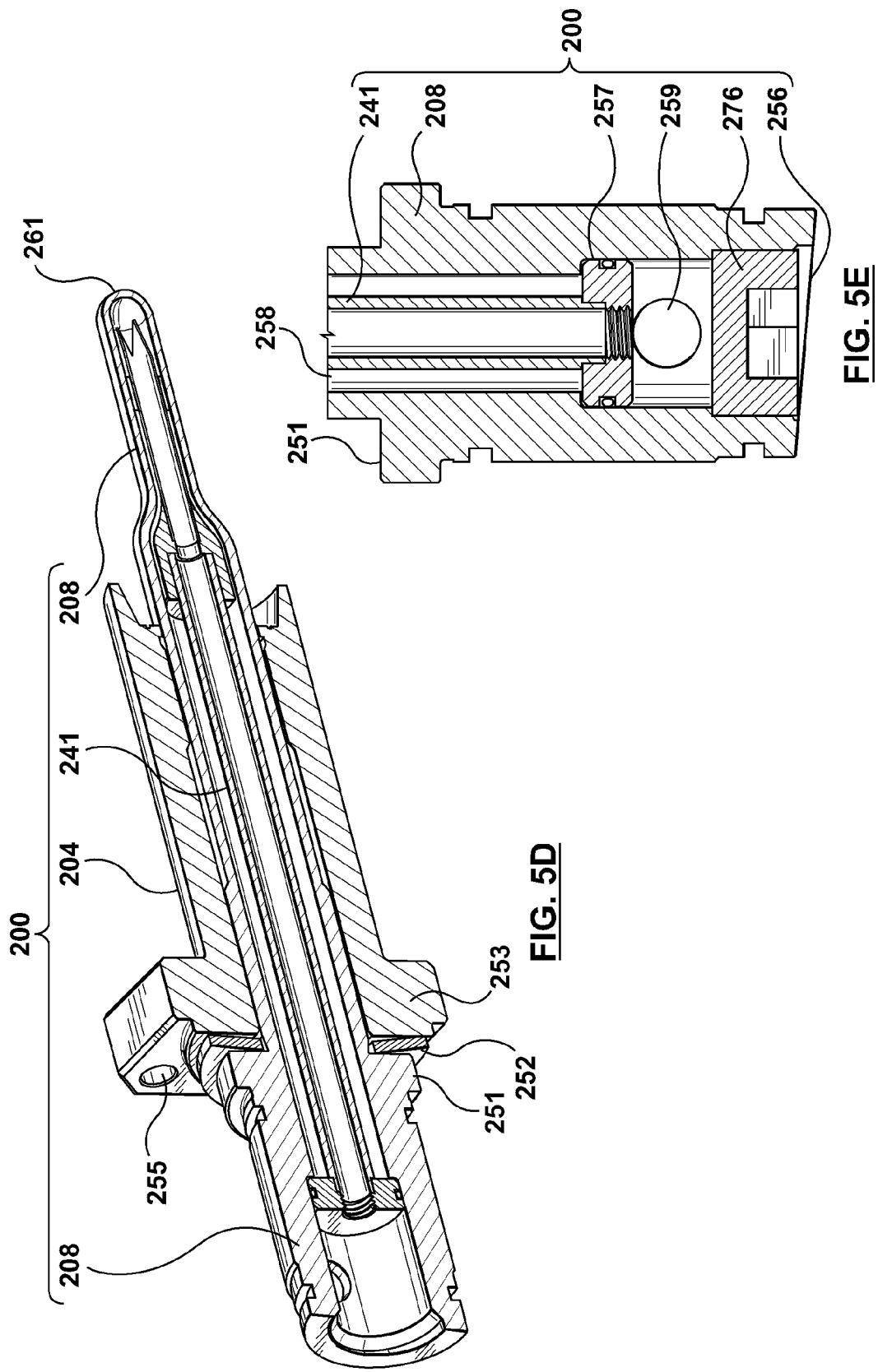

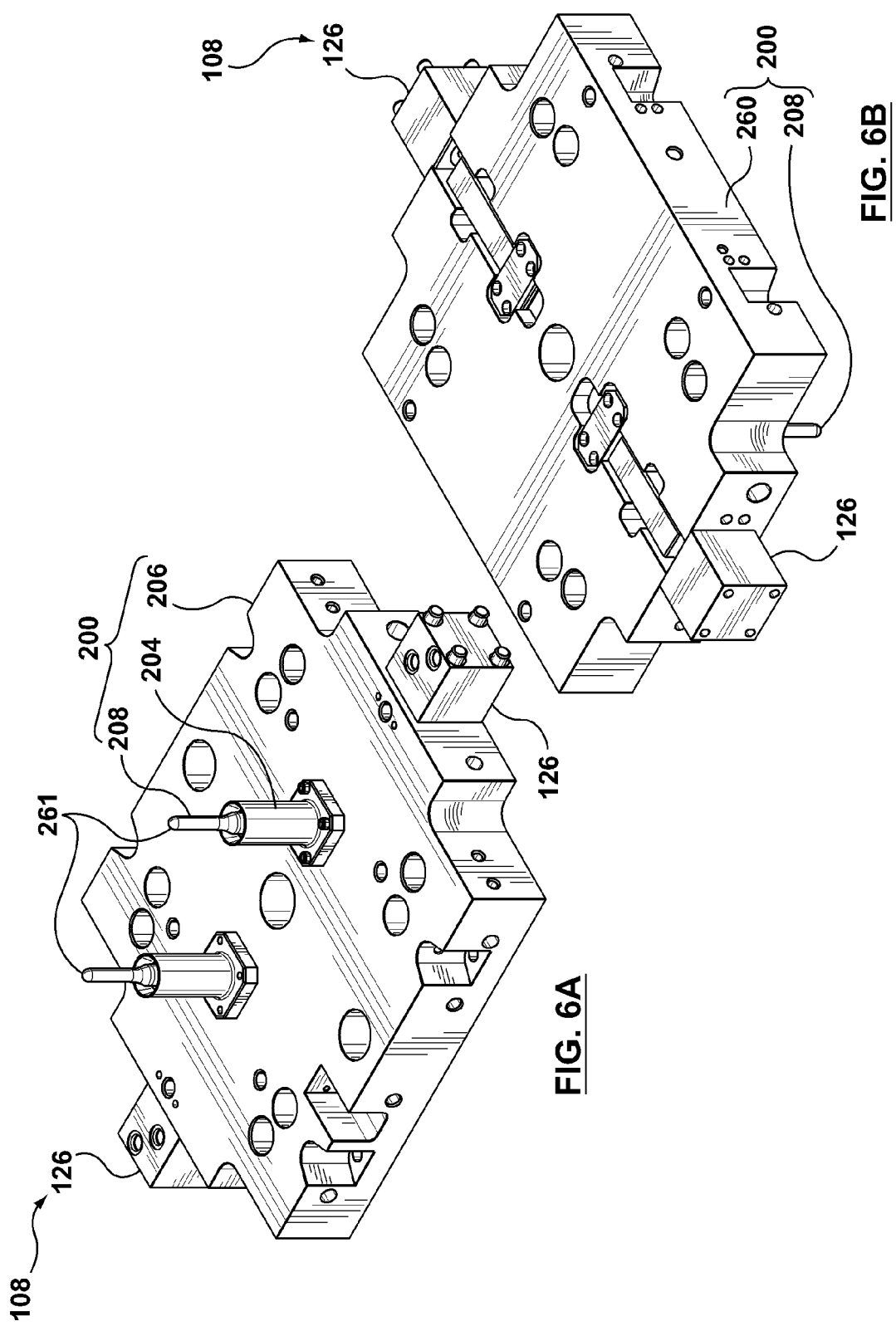

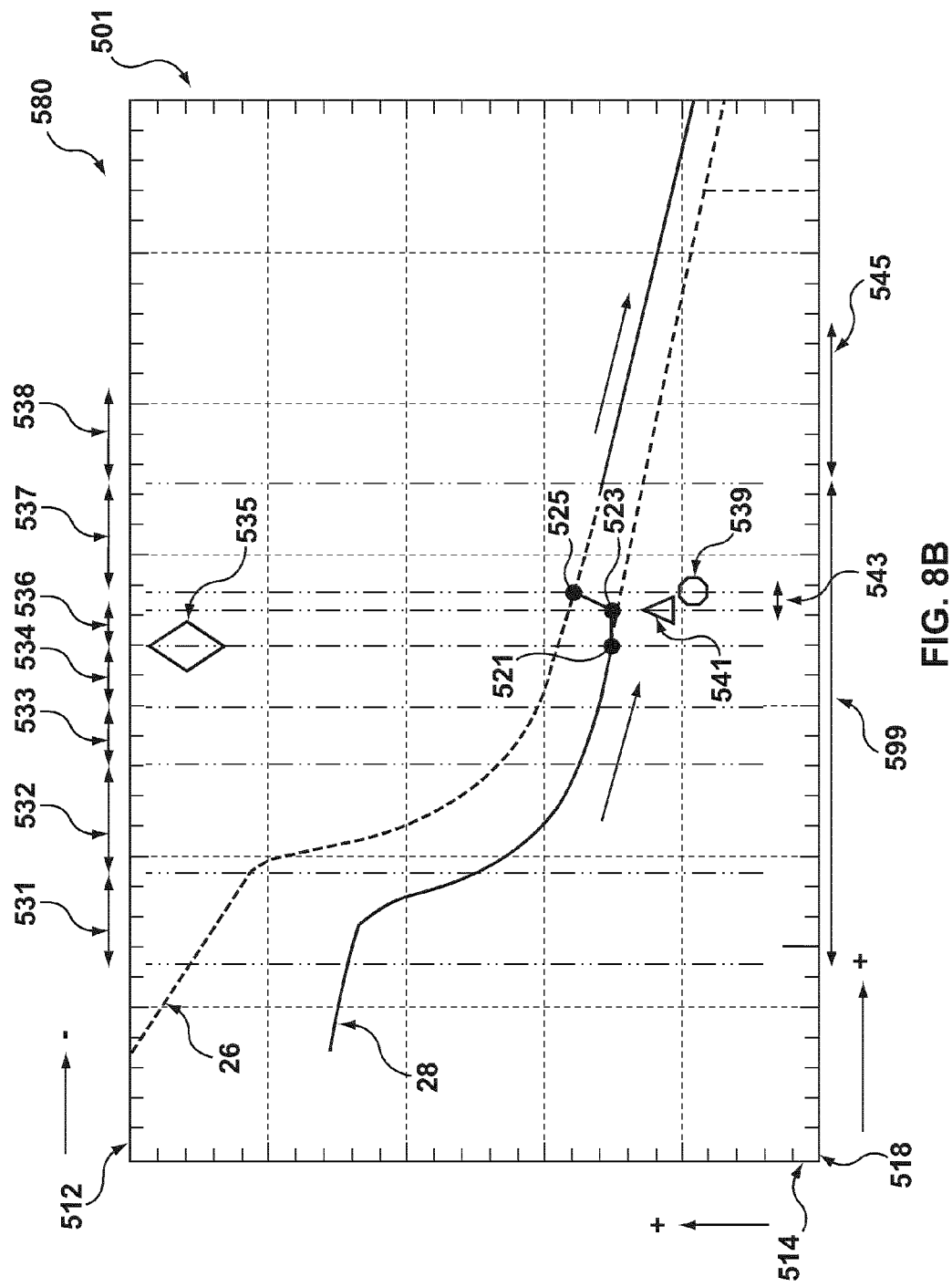

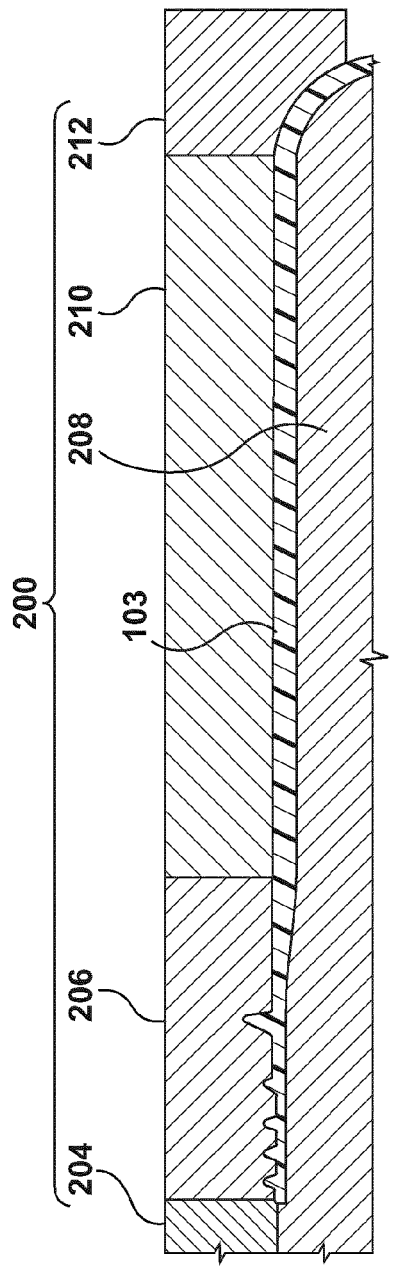
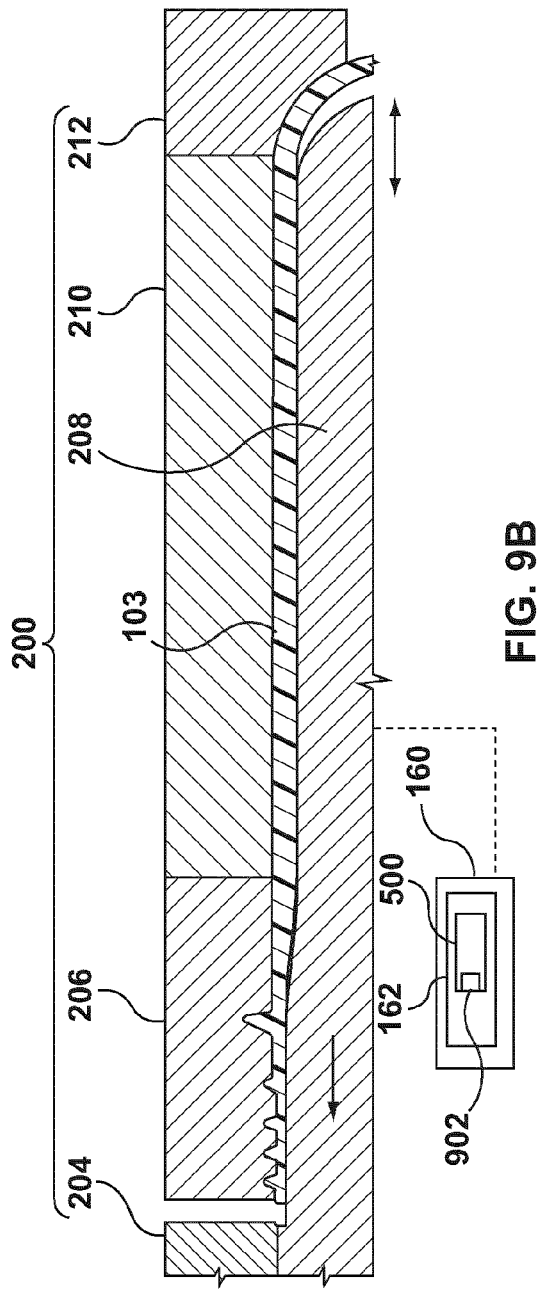

METHOD AND SYSTEM FOR OPERATING AN INJECTION MOLDING MACHINE

TECHNICAL FIELD

The present invention relates to molding systems in general, and more specifically to a method and system for operating an injection molding machine.

BACKGROUND

Examples of known molding systems are (amongst others): (i) the HYPET (TRADEMARK) Molding System, (ii) the QUADLOC (TRADEMARK) Molding System, (iii) the HYLECTRIC (TRADEMARK) Molding System, and (iv) the HYMET (TRADEMARK) Molding System, all manufactured by Husky Injection Molding Systems (Location: Canada).

U.S. Pat. No. 4,522,778 (Inventor: BACIU et al.; Published: 1985-06-11) discloses a method and apparatus for production of parts made from a plastics material using an injection press in which a mold cavity is defined by a mold surface and a surface of a movable piston. Firstly, the plastics material is introduced into the mold cavity, and during injection the piston is kept stationary for a time to form a rough mold and then retracted to form a parison. Secondly, after injection has been completed the piston is advanced again, and maintained in position while cooling takes place. Thirdly, the mold is opened and the part is ejected from the mold cavity.

European Patent Number 244783 (Inventor: MAUS et al.; Published: 1987-11-11) discloses a method and apparatus for injection compression molding of thermoplastic parts. Enlarged mold cavities receive plasticized resin, and compression of the injected resin is provided by a toggle clamp assembly. Preferably, the toggle clamp assembly provides multiple-stage compression of the resin to first redistribute the resin and vent the cavities and, second, compress the resin to compensate for cooling-induced shrinkage thereof. In the multiple cavities, because all cavities are equally compressed simultaneously, control of the molding process and balancing of the mold are readily accomplished.

European Patent Number 369009 (Inventor: UEHARA et al.; Published: 1990-05-23) discloses a desired quantity of a molten thermoplastic resin injected into a mold cavity which has a greater capacity than a product volume and is set in advance to a higher temperature than the temperature at which the thermoplastic resin starts curing under a normal pressure. The thermoplastic resin thus injected is cooled inside the mold cavity and is pressed before it is cooled down to a temperature at which it starts curing under a normal pressure. Due to this pressing, the glass transition point of the thermoplastic resin is shifted to a higher temperature side and the thermoplastic resin cures during a small temperature drop. The thermoplastic resin is cooled in the pressed state until dynamic rigidity at normal temperature and normal pressure is obtained. The thermoplastic resin is further cooled to a withdrawing temperature and the pressure applied to the thermoplastic resin is controlled so that dynamic rigidity of the thermoplastic resin during this cooling process can be maintained at the normal temperature and normal pressure by offsetting the rise of dynamic rigidity of the thermoplastic resin to be caused by cooling.

European Patent Number 425060 (Inventor: KASAI et al.; Published: 1991-05-02) discloses a process for effecting injection molding of plastic resin products on an injection molding apparatus including a metal mold composed of a slidable mold element and a fixed mold element defining together a mold cavity, an actuator for sliding the slidable mold element, and an injection means with an injection nozzle permissible of adjusting the nozzle flow path section. The operation includes: (i) a first molding step of injecting a molten resin into the mold cavity which has been preset by the slidable mold element so as to include a post-compression margin to be compressed afterwards in a second molding step, to effect the injection under a reduced molding pressure, while causing a temperature elevation and, thus, a viscosity reduction of the molten resin, until the mold cavity has been filled up, and (ii) a second molding step of compressing the resin so charged in the mold cavity by operating the slidable mold element to compress the charged resin to compensate said post-compression margin, so as to allow an effective pressing force to be imposed onto the charged resin within the mold cavity also after the mold gate has been sealed.

European Patent Number 593308 (Inventor: HENDRY; Published: 1994-04-20) discloses a mold apparatus and method to form a solid injection molded plastic part. The mold portions of the mold apparatus are closed, charges of molten thermoplastic and pressurized gas are sequentially injected into a mold cavity, and the mold portions are sequentially separated and closed. The pressurized gas forces the hot plastic away from one mold half and against the other mold half, and separation of the mold portions ensures uniform distribution of the pressurized gas behind the hot plastic, which pressure is maintained during cooling.

Depending on the application, the plastic completely packs the cavity, fills but does not pack the cavity, and the mating faces can be abutted or maintained partially separated when the mold portions close. A gas seal is formed by the plastic to prevent gas in the mold cavity from reaching the finished exterior surface of the part during shrinkage of the plastic.

European Patent Number 597108 (Inventor: MORIKITA; Published: 1994-05-18) discloses a localized pressurizing type injection molding machine for applying various processes to moldings during an injection-molding cycle; the injection molding machine can apply various processes to the moldings after the injection molding process.

European Patent Number 944466 (Inventor: HEHL; Published: 1999-09-29) discloses a process for manufacturing injection moldings in an injection molding machine for processing plasticized masses, in which a regulated subsequent pressure is applied by the injection molding unit. At least in the areas of the molding away from the sprue, the subsequent pressure is generated by a regulated volume alteration of the mold cavity. The subsequent pressure can be distributed during the subsequent pressure phase even in the case of complex moldings.

European Patent Number 1343621 (Inventor: WEINMANN; Published: 2003-09-17) discloses controlled correction of possible quantitative errors in the production of optical data supports. The cavity of the mold is only partially filled prior to the stamping phase. It is the subsequent stamping that is used to complete the filling process by moving one mold half. In the first phase of stamping or compressing the melt, the pressure is detected in defined positions of the molds or at a defined point in time and any deviation from a predetermined set pressure value is corrected by the immediate introduction of a movement change in the stamping process. By acting on the pressure conditions in the mold cavity, it is possible to influence the backflow before the sprue is set, in terms of a set weight value of the finished data support.

PCT Patent Application Number WO/2007/039766 (Inventor: CLARKE; Published: 2007-04-12) discloses a mold for mounting between relatively movable platens of an injection molding press for injection impact compression molding of an article. The mold comprises a cavity plate formed with a depression, a core plate having a projecting core at least part of the outer surface of which is cylindrical, and a closure plate movable relative to the core plate and the cavity plate, and a surface in sealing contact with the cylindrical outer surface of the core. A locking mechanism is provided to lock the closure plate relative to the cavity plate while permitting the core plate to move relative to the cavity plate.

U.S. Pat. No. 7,293,981 (Inventor: NIEWELS; Published: 2007-11-13) discloses a method and apparatus for compressing melt and/or compensating for melt shrinkage in an injection mold. The apparatus includes a cavity mold portion adjacent a cavity plate, a core mold portion adjacent a core plate, a mold cavity formed between the mold portions, and at least one piezo-ceramic actuator disposed between either or both of the core plate and the core mold portion and the cavity plate and the cavity mold portion. A controller may be connected to the at least one piezo-ceramic actuator to activate it, thereby causing the mold cavity volume to decrease, compressing the melt.

United States Patent Application Number 2008/0026239 (Inventor: BALBONI; Published: 2008-01-31) discloses a preform that is formed by an upper neck which maintains unchanged its form in the final object and a hollow body, joined to the neck. The method foresees the insertion, within a matrix cavity, of a metered body of polymeric material whose mass is metered according to a reference value, and the subsequent pressure insertion of a punch within the matrix cavity until it closes the mold's molding chamber, the punch conferring the shape to the inner surface of the preform and the matrix having an inner surface which confers the shape to the outer surface of the preform. In the molding of the preform, the error of the mass of the metered body with respect to the reference value is distributed in the hollow body, which undergoes a subsequent hot deformation until it achieves the final shape. In the mold, the matrix comprises at least one deformable wall whose inner surface defines at least part of the inner surface of the matrix part intended to give form to the hollow body of the preform, said deformable wall having, at least in part, a relatively thin thickness which permits it to be elastically deformed under the pressure of the polymeric material in the final preform molding step, thereby varying the thickness of the hollow body.

SUMMARY

The inventors believe that the persons of skill in the art do not fully understand the problem associated with the state of the art. The following description provides an understanding of the problem and the solution provided by the aspects of the present invention.

FIG. 1 depicts a schematic representation of a graph 10 having known PVT curves 16, 18 of a known PET resin. It will be appreciated that the PVT curves 16, 18 are provided by way of example, and that the present invention is not necessarily limited to any particular PVT per se or any PVT curve for that matter, and that the present invention is applicable to any resin material where density of the resin changes with temperature. PVT stands for pressure, volume, and temperature. PET is the common name for a unique plastic belonging to the polyester family. PET polyester is formed from ethylene glycol (EG) and terephthalic acid (TPA), sometimes called purified terephthalic acid or PTA. PET's full chemical name is polyethylene terephthalate. The PET bottle is the modern, hygienic package of choice for many food products—particularly carbonated soft drinks and water.

The graph 10 includes a temperature axis 12 aligned along a horizontal direction of the graph 10 (that is, located along the bottom side of the graph 10) and increasing in magnitude from the left side to the right side of the graph 10. The graph 10 also includes a specific volume axis 14 aligned along a vertical direction of the graph 10 (that is located along the left side of the graph 10) and increasing in magnitude from the bottom side to the top side of the graph 10. The PVT curve 16 represents the characteristics (that is, the temperature and volume characteristics) of the known PET resin for a relatively lower internal pressure of the known PET resin. The PVT curve 18 represents the characteristics of the PET resin for a relatively higher internal pressure of the PET resin. It will be appreciated that the curves 16 and 18 usable for any type of pet resin.

FIG. 2 depicts a schematic representation of a graph 20 having a known molding cycle 30 superimposed on modified PVT curves 26, 28 of the PET resin of FIG. 1. It will be appreciated that the graph 20 depicts flipped versions of the curves 16, 18 depicted in FIG. 1. Specifically, the modified PVT curves 26, 28 of FIG. 2 are the flipped versions (that is, flipped side to side) of the curves 16, 18 of FIG. 1, respectively. The arrangement depicted in FIG. 2 permits the depiction of time as increasing from the left side to the right side of the graph 20, and that the known cycle of a known molding machine may be better understood when time is depicted in this fashion. The graph 20 includes a time axis 18 aligned along a horizontal direction of the graph 20 (that is, located along the bottom side of the graph 20) and increasing from the left side to the right side of FIG. 2. The graph 20 also includes the specific volume axis 14 aligned along a vertical direction of the graph 20 (that is, located on the left side of the graph 20), and increasing from the bottom side to the top side of FIG. 2. The graph 20 also includes the temperature axis 12 aligned the horizontal direction of the graph 20 (that is, located along the top side of the graph 20), and increasing from the right side to the left side of FIG. 2.

A known cycle time or operation 30 of a known molding system includes (more or less): an operation 31, an operation 32, an operation 33, an operation 34, an operation 35, an operation 36, an operation 37, and an operation 38. The operations 31 to 38 are depicted along the top side of FIG. 2. The modified PVT curve 28 is used to describe the characteristics of the known PET resin during the operations 31, 32, 33, 34 and 35. The characteristics of the PET resin during operation 36 is described by a horizontally aligned line extending between a point 21 and a point 22, which represent terminus points for a beginning and an ending of the operation 36. The horizontal line (that extends between the point 21 and the point 22) is used because a volume of a mold cavity does not increase or decrease during the operation 36, and therefore the volume of the molten resin in the mold cavity does not change during the operation 36. The modified PVT curve 26 is used to describe the characteristics of the known PET resin during operations 37 and 38.

The operation 31 includes closing a mold cavity. The operation 32 includes locking the mold cavity shut and pressurizing a clamp assembly so as to apply clamp tonnage to the mold assembly. The operation 33 includes injecting melted resin into the mold cavity volume of the mold assembly; it will be appreciated that the operation 33 is sometimes known as the "fill" cycle. The operation 34 includes slowly adding the melted resin to maintain a full cavity volume; it will be appreciated that the operation 34 is also known as the "hold" cycle. The operation 34 provides compensation for the pressure change of the melt in the mold cavity as the temperature of the resin or melt drops; specifically, as the temperature drops the tendency is for the pressure to drop, but the operation 34 is used to maintain or control (or may increase) the pressure of the molten resin during the operation 34. This arrangement results in increased density by pushing more of the melt into the mold cavity.

Typically, at the end of the hold cycle or the operation 34, the operation 35 is executed; the operation 35 includes shutting off the mold cavity or isolating the mold cavity; the operation 35 is sometimes referred to as the "shut-off cycle" (that is, the time taken to close the mold gate, which is expected to be a very short duration). The operation 35 includes moving a valve stem into a mold gate that leads into the mold cavity, and the valve stem is used to stop further movement of the molten resin into and out from the mold cavity (via the mold gate).

The operation 36 permits the molten resin in the mold cavity to cool down for a period of time; the operation 36 is commonly known as the "cool" cycle, in which the molded part is cooled while it remains held in the mold assembly. During the operation 36, the mold gate (sometimes called the "gate nub") is allowed to freeze. As the molten resin cools down and the internal pressure remaining within the molten resin is reduced, but the density of the molten resin remains the same because the mass of the molten resin and the volume of the molten resin do not change (since the mold cavity is isolated from the upstream melt as a result of the valve stem blocking the mold gate.

The operation 37 includes depressurizing a clamp assembly and unlocking a mold assembly. Since the internal pressure of the resin in the mold cavity has reduced to near zero or preferably zero pressure, there is very little or no danger of undesired or inadvertent (unwanted) opening of the mold assembly (this is the preferred situation so that the molded article is not inadvertently damaged by allowing the mold assembly to pop open under pressure); in this manner the mold assembly is safely opened. The operation 38 includes removing the molded article formed in the mold cavity, and then passing the molded article to a post mold cooling apparatus for further temperature reduction if so desired.

It will be appreciated that the PVT curves and the operations of the cycle 30 are not accurately drawn, but were drawn for illustrative purposes for ease of explaining the concepts. It will be appreciated, for example, that typically, (i) the amount of time for the operation 34 (hold cycle) is approximately equal to three times longer than the time required for the operation 36 (cool cycle), and (ii) the time for the operation 33 (injection cycle) plus the time for the operation 36 (cool cycle) is approximately equal to the time for the operation 34 (hold cycle).

The inventors believe that the aspects of the present invention provide a technical solution to the problem at hand. Specifically, the problem at hand is believed to pertain to cycle time, and more specifically it is believed to be about reducing cycle time. A reduction of even a fraction of a one second represents a significant improvement for an injection molding system used to manufacture PET preforms. It is believed that the cycle time of the injection molding system can be significantly reduced by using the aspects of the present invention.

The inventors have arrived at an understanding that the cool time during the operation 36 disadvantageously adds a substantial portion of time to the cycle time of the injection molding system; the inventors believe that the operation 36 serves several functions. A typical PET preform requires (for example) approximately 1.5 seconds of cool cycle for a twelve second total cycle time, which represents 12.5% of the total cycle time of the injection molding system. The functions provided by the operation 36 are as follows: (i) freezing off the mold gate area (sometimes called a gate nub) of the preform, and (ii) reducing an internal pressure of the PET perform, so that the mold assembly may be opened safely (that is, without inadvertently damaging the molded part or perform in specific and/or the mold assembly as well).

The inventors believe that the solution to the problem of reducing the cycle time is to reduce or (more preferably) overlay the time used for the operation 36 (that is, the cool cycle) by having other molding-system operations execute, at least in part, the functions associated with operation 36. This feat or arrangement is accomplished by managing the internal pressure of the PET perform (that is, the molded article) preferably through physical methods, such as altering the effective volume of a mold cavity to manipulate an internal pressure of the molten resin received in the mold cavity while the mold cavity remains in an isolated condition.

The inventors believe that the state of the art does not overlay the operation 34 and the operation 36, and the aspects of the present invention is to overlay the operation 34 and the operation 36 so that the operation 36 is carried out in parallel with at least a portion of the operation 34. The overlaying of operation 34 and operation 36 requires a modification of the operations 34, 36. Namely, pressure control during operation 34 has to be done with another device acting on the pressurized melt held in the mold assembly. Decompression at the end of the operation 36 needs to be provided by a different mechanism than the natural change in density of the resin as a function of cooling the "locked-in" material.

The inventors believe that the technical advantage of the aspects of the present invention is a reduction in an overall cycle time of the injection molding system.

In accordance with a first aspect of the present invention, there is provided a molding system being configured to manufacture a molded article in a mold-cavity system by using a molding material, the molding system including: a pressure-control system being coupled with the mold-cavity system; and a controller operatively coupling to the pressure-control system, the controller having a controller-usable memory tangibly embodying a set of controller-executable instructions being configured to direct the controller, the set of controller-executable instructions including: mold-unpack instructions, including instructing the controller to control the pressure-control system to reduce, after solidification, at least in part, of the molding material being located in a nub region of the mold-cavity system, internal pressure of the molding material received in the mold-cavity system while the mold-cavity system remains isolated from a stream of flowable-molding material, beyond any reduction of the internal pressure in the molding material resulting from cooling of the molding material, so that the reduction in the internal pressure of the molding material is enough to permit safe opening of the mold-cavity system while permitting safe extraction of the molded article from the mold-cavity system.

In accordance with a second aspect of the present invention, there is provided a method of operating a molding system being configured to manufacture a molded article in a mold-cavity system by using a molding material, the molding system having a pressure-control system being coupled with the mold-cavity system, the method including: controlling the pressure-control system to reduce, after solidification, at least in part, of the molding material being located in a nub region of the mold-cavity system, internal pressure of the molding material received in the mold-cavity system while the mold-cavity system remains isolated from a stream of flowable-molding material, beyond any reduction of the internal pressure in the molding material resulting from cooling of the molding material, so that the reduction in the internal pressure of the molding material is enough to permit safe opening of the mold-cavity system while permitting safe extraction of the molded article from the mold-cavity system.

According to another aspect of the present invention, there is provided molding system being configured to manufacture a molded article by using a molding material. The molding system comprises a mold-cavity system for forming, in use, the molded article; the mold-cavity system including: a primary parting line defined between a cavity portion and a neck portion 206 and; a secondary parting line defined between the neck portion and a top portion; a controller operatively coupling to the a mold-moving actuator, the controller having a controller-usable memory tangibly embodying a set of controller-executable instructions being configured to direct the controller, the set of controller-executable instructions including a mold open instruction configured to cause initial separation of the top portion and the neck portion relative to the secondary parting line, while keeping the primary parting line un-opened, while maintaining at least some clamp force.

According to yet another broad aspect of the present invention, there is provided a molding system being configured to manufacture a molded article by using a molding material. The molding system comprises a mold-cavity system for forming, in use, the molded article; the mold-cavity system including: a stationary-mold assembly and a movable-mold assembly, defining therebetween a mold cavity; the movable-mold assembly including: a base portion, a top portion, a neck portion; a core portion, the stationary-mold assembly including: a cavity portion, and a gate portion; a controller operatively coupling to the a mold-moving actuator, the controller having a controller-usable memory tangibly embodying a set of controller-executable instructions being configured to direct the controller, the set of controller-executable instructions including a mold open instruction configured to cause relative movement between the core portion and the cavity portion by a distance sufficient to displace the totality of molecules of plastic of the molded article that abut with the core portion from their relative positioning during a process cycle, the displacement being in substantially the same direction, while maintaining at least some of the clamping force.

BRIEF DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which:

FIGS. 5A, 5B, 5C, 5D, 5E depict additional schematic representations of the mold-cavity system 200 of FIG. 4;

FIGS. 6A, 6B, 6C, 6D, 6E, 6F, 6G depict schematic representations of a pressure-control system 126 used in the molding system 100 of FIG. 3;

FIGS. 8A, 8B depict schematic representations of graphs 401 and 501, respectively, having a cycle time 499 and a cycle time 599, respectively, superimposed on modified PVT curves 26, 28 of the PET resin of FIG. 2; and FIGS. 9A and 9B are schematic representations of the mold cavity system, implemented in accordance with another non-limiting embodiment.

Figure 1:
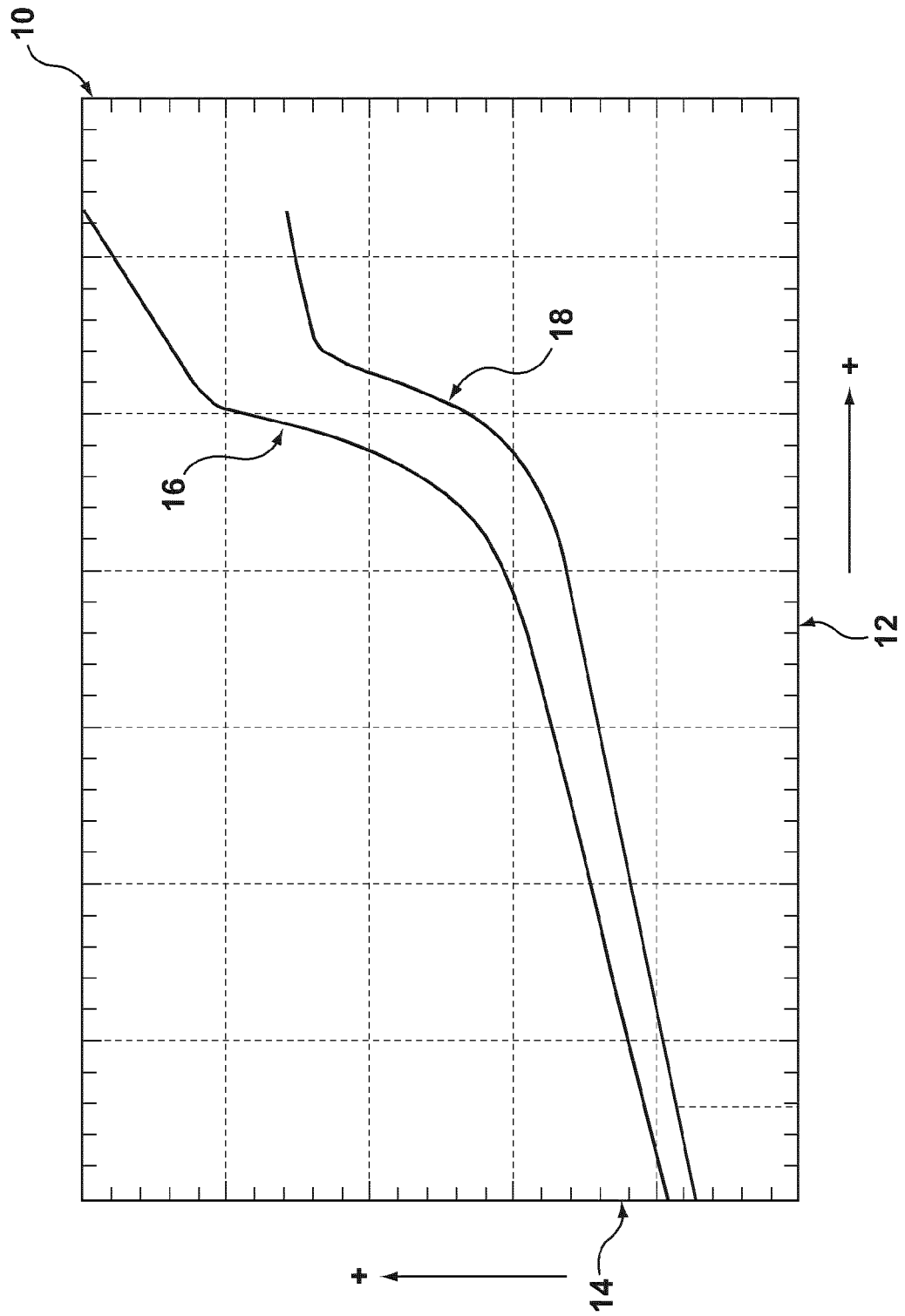
FIG. 1 depicts the schematic representation of the graph 10 having known PVT curves 16, 18 of the known PET resin.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

REFERENCE NUMERALS USED IN THE DRAWINGS

The following is a listing of the elements designated to each reference numerals used in the drawings:

| | |
|---|---|
| 10 graph | 16 known pvt curves |
| 18 known pvt curves | 20 graph |
| 26 modified pvt curve | 28 modified pvt curve |
| 30 known cycle time | 36 operation |
| 100 molding system | 101 molding material |
| 102 stationary platen | 103 molded article |
| 104 movable platen | 106 platen bars |
| 107 nub portion | 108 group of controllable systems |
| 109 parting line | 120 platen actuator |
| 121 bar locks | 122 clamp assemblies |
| 124 mold-cooling system | 126 pressure-control system |
| 128 melt-preparation system | 140 hopper |
| 141 feed throat | 142 barrel assembly |
| 143 heater assembly | 144 machine nozzle |
| 145 screw assembly | 146 screw drive |
| 150 housing | 151 hydraulic piston |
| 152 chamber | 153 stop |
| 154 seal | 156 link |
| 157 wedge | 158 coupler |
| 160 controller | 162 controller-usable memory |
| 200 mold-cavity system | 201 stationary-mold assembly |
| 202 base portion | 203 movable-mold assembly |
| 204 top portion | 206 neck portion |
| 208 core portion | 210 cavity portion |
| 212 gate portion | 213 mold cavity |
| 214 nub region | 216 mold gate |
| 222 parting line | 224 witness line |
| 226 split line | 240 core-cooling circuit |
| 241 cooling tube | 242 cavity-cooling circuit |
| 244 nub-cooling circuit | 246 cooling tube |
| 247 rib assembly | 249 jacket assembly |
| 251 shoulder portion | 252 spring |
| 253 bottom surface | 254 bolt |
| 255 mounting bore | 256 bottom face |
| 257 tube mount | 258 tube-receiving bore |
| 260 plate assembly | 261 tip |
| 264 locating device | 265 wedge-receiving groove |
| 266 surface | 267 wedge body |
| 268 wedge groove | 269 link body |
| 270 link head | 271 link shoulder |
| 272 housing cover | 273 plate body |
| 274 wedge cavity | 275 cooling circuit |
| 276 plug | 300 hot-runner system |
| 401 graphs | 412 temperature axis |
| 414 specific volume axis | 418 time axis |
| 420 graph | 421 point |
| 423 point | 425 point |
| 430 operation | 431 operation |
| 432 operation | 433 operation |
| 434 operation | 435 operation |
| 436 operation | 437 operation |
| 438 operation | 439 region |

-continued

| | |
|---|---|
| 441 region | 443 amount of time |
| 445 time | 480 molding operation |
| 499 cycle time | 500 set of controller-executable instructions |
| 501 graphs | 502 melt-preparation instructions |
| 504 mold-close instructions | 506 mold-lock instructions |
| 508 tonnage-engage instructions | 510 melt-stream connection instructions |
| 512 mold-injection instructions | 514 mold-pack instructions |
| 516 melt-stream disconnection instructions | 518 heat-reduction instructions |
| 519 time axis | 520 mold-unpack instructions |
| 521 point | 522 tonnage-disengage instructions |
| 523 point | 524 mold-unlock instructions |
| 525 point | 526 mold-open instructions |
| 530 hold instructions | 531 compensation instructions |
| 532 mold-volume increase instructions | 540 mold-volume reduction instructions |
| 542 mold-volume increase instructions | 543 amount of time |
| 545 time | 580 aggressive cycle operation |
| 590 first non-limiting variation | 592 second non-limiting variant |
| 599 cycle time | |

DETAILED DESCRIPTION OF THE PREFERRED EMBODIMENT(S)

Figure 3:
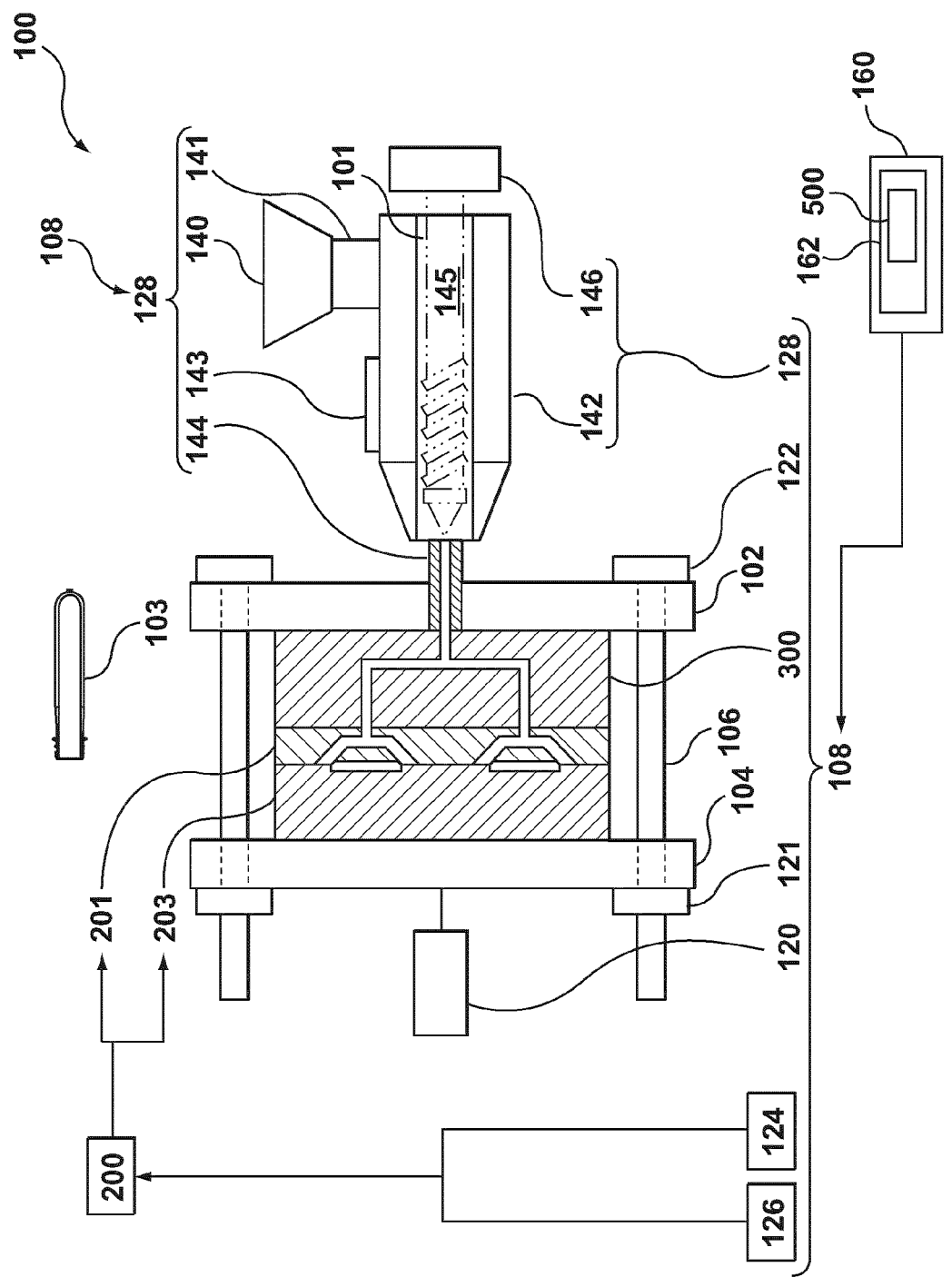
FIG. 3 depicts a schematic representation of a molding system 100 in accordance with a first non-limiting embodiment.

FIG. 3 depicts the schematic representation of the molding system 100. It will be appreciated that the molding system 100 includes components that are known to those skilled in the art, and these known components will not be described here; these known components are described, at least in part, in the following reference books, for example: (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Machines*" 3rd Edition authored by JOHANNABER (ISBN 3-446-17733-7) and/or (iv) "*Runner and Gating Design Handbook*" authored by BEAUMONT (ISBN 1-446-22672-9).

Figure 4:
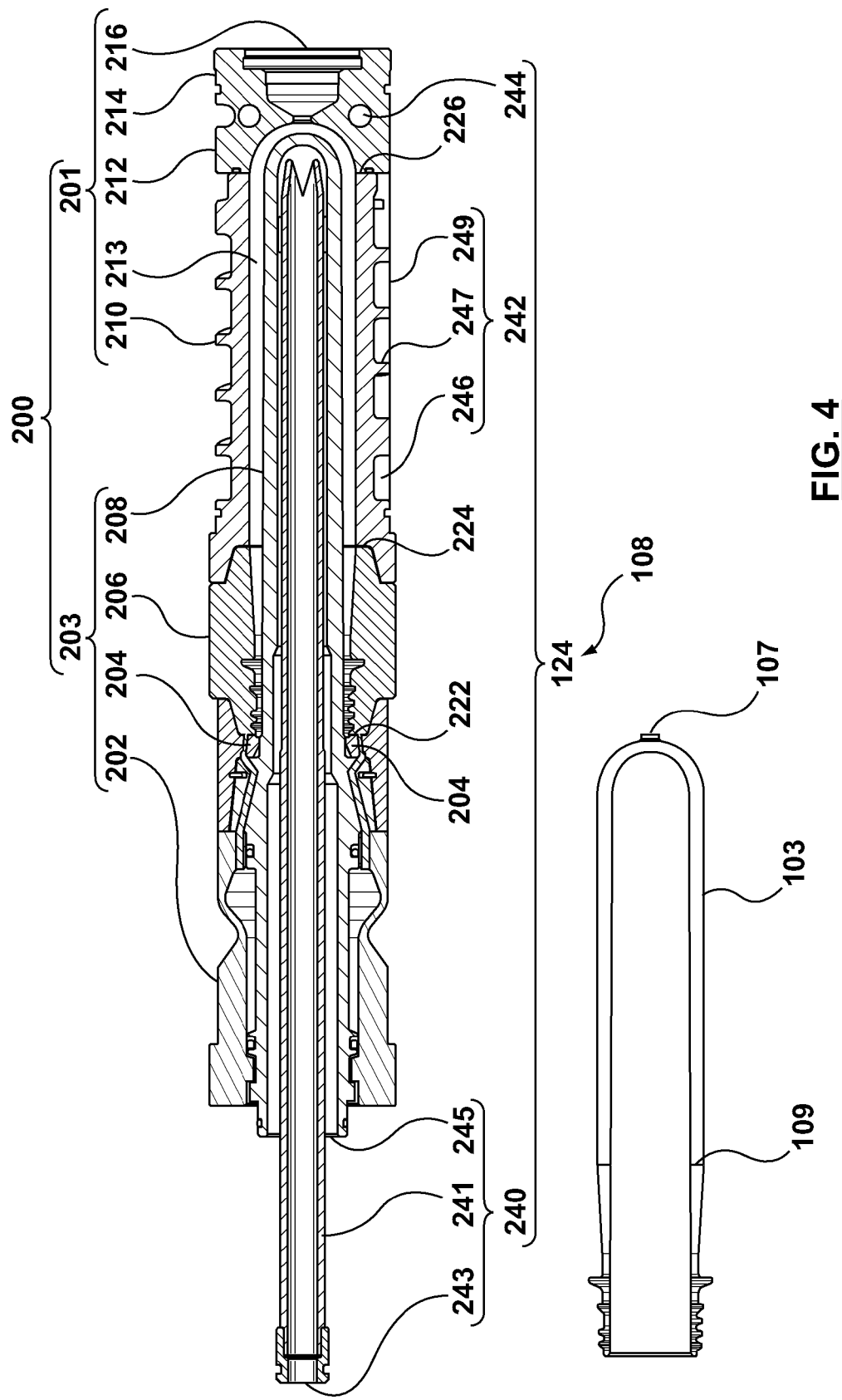
FIG. 4 depicts a schematic representation of a mold-cavity system 200 used in the molding system 100 of FIG. 3.

The molding system 100 is configured to manufacture a molded article 103 by using a mold-cavity system 200 and using a molding material 101. The mold-cavity system 200 includes a stationary-mold assembly 201 and a movable-mold assembly 203. Details for the mold-cavity system 200 are depicted in FIG. 4. The molding system 100 includes (but is not limited to): (i) a hot-runner system 300, (ii) a stationary platen 102, (iii) a movable platen 104, (iv) platen bars 106, (v) a group of controllable systems 108, and (iv) a controller 160. The group of controllable systems 108 includes (but is not limited to): (i) a platen actuator 120, (ii) bar locks 121, (iii) clamp assemblies 122, (iv) a mold-cooling system 124, (v) a pressure-control system 126 and, (vi) a melt-preparation system 128 (also called an extruder). The components of the mold-cooling system 124 are depicted in FIG. 4. The components of the pressure-control system 126 are depicted in FIG. 6. The hot-runner system 300 is coupled with the stationary-mold assembly 201. The stationary platen 102 is configured to support the hot-runner system 300 and the stationary-mold assembly 201. The movable platen 104 is configured to support the movable-mold assembly 203, and is movable relative to the stationary platen 102. The platen bars 106 operatively extend between the stationary platen 102 and the movable platen 104. The platen actuator 120 is coupled with the movable platen 104. The bar locks 121 lockably couple the platen bars 106 with the movable platen 104. The clamp assemblies 122 are coupled with the platen bars 106.

The clamp assemblies 122 are configured to apply a clamp tonnage to the platen bars 106. The mold-cooling system 124 is configured to couple with the mold-cavity system 200. The details for the pressure-control system 126 are depicted in FIG. 6. The pressure-control system 126 is configured to couple with the mold-cavity system 200.

The melt-preparation system 128 is configured to couple with the mold-cavity system 200. The melt-preparation system 128 includes (but is not limited to): a hopper 140, a feed throat 141, a barrel assembly 142, a heater assembly 143, a machine nozzle 144, a screw assembly 145, and a screw drive 146. The hopper 140 receives solid particles of resin. The feed throat 141 connects the hopper 140 to the barrel assembly 142. The heater assembly 143 is connected with the barrel assembly 142. The machine nozzle 144 connects the barrel assembly 142 with the hot-runner system 300. The screw assembly 145 is received in the barrel assembly 142 and the screw drive 146 is connected with the screw assembly 145. In operation, the screw assembly 145 prepares the melt and injects the melt under pressure through the machine nozzle 144 and into the hot-runner system 300, and then the hot-runner system 300 distributes the melt into respective mold cavities defined in the mold-cavity system 200.

Figure 7:
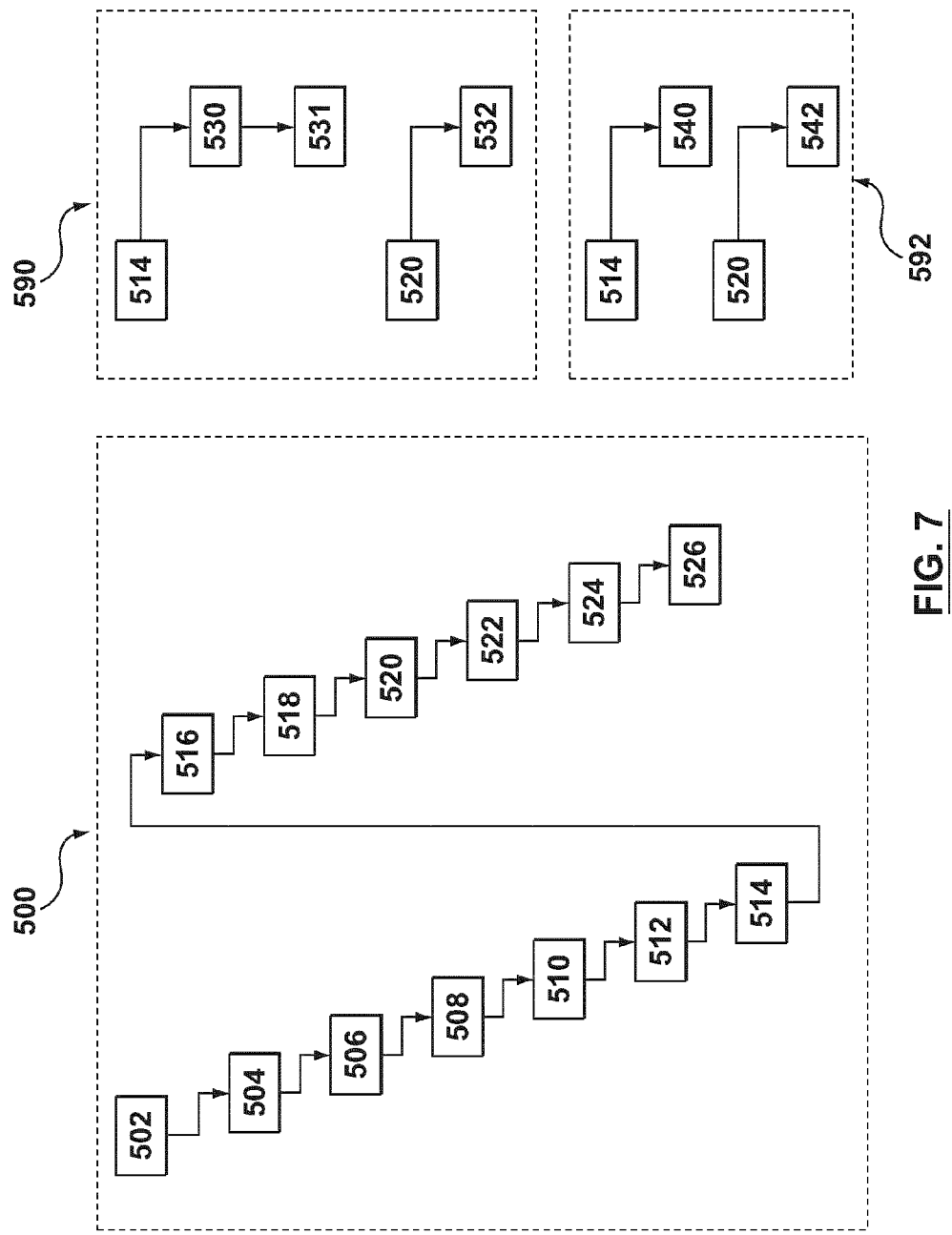
FIG. 7 depicts a schematic representation of a set of controller-executable instructions 500 having instructions for operating the molding system 100 of FIG. 3.

The controller 160 is operatively coupling to the group of controllable systems 108. The controller 160 has a controller-usable memory 162 tangibly embodying a set of controller-executable instructions 500 that are configured to direct the controller 160 to control instructions of the molding system 100. The set of controller-executable instructions 500 are depicted in FIG. 7.

FIG. 4 depicts the schematic representation of the mold-cavity system 200 used in the molding system 100 of FIG. 3. The mold-cavity system 200 includes the stationary-mold assembly 201 and the movable-mold assembly 203. The movable-mold assembly 203 includes a base portion 202, a top portion 204, a neck portion 206, and a core portion 208. Mold-moving actuators (not depicted) are connected with the components of the movable-mold assembly 203. The stationary-mold assembly 201 includes a cavity portion 210, a gate portion 212, a nub region 214, and a mold gate 216. Between the neck portion 206 and the top portion 204 there is a parting line 222. Between the cavity portion 210 and the neck portion 206, there is a witness line 224. Between the cavity portion 210 and the gate portion 212 there is a split line 226. Between the top portion 204 and the core portion 208 there is a split line.

The mold-cooling system includes: a core-cooling circuit 240, a cavity-cooling circuit 242, and a nub-cooling circuit 244. The core-cooling circuit 240 includes a cooling tube 241, an inlet 243 formed at the end of the cooling tube 241, and an outlet 245 formed between the outer surface of the cooling tube 241 and the base portion 202. The cooling tube 241 extends into the interior of the core portion 208 to an area located near the nub region 214. A cooling fluid, such as water, flow from the inlet 243 to the tip of the cooling tube 241 and strikes the core portion 208 that is located near the nub region 214, and flows back to the outlet 245 between the outer surface of the cooling tube 241 and the core portion 208 and the base portion 202. The cavity-cooling circuit 242 includes cooling tube 246, a rib assembly 247, and a jacket assembly 249. The rib assembly 247 includes a set of ribs extending outwardly from the cavity portion 210. The jacket assembly 249 is received overtop of the rib assembly 247 (the jacket assembly 249 is not depicted along the top side of the cavity portion 210 for illustrative purposes). The cooling tube 246 is defined by the outer surface of the cavity portion 210, the rib assembly 247 and the jacket assembly 249. The nub-cooling circuit 244 includes a passageway defined in the gate portion 212.

It will be appreciated that a mold cavity 213 is formed within the mold-cavity system 200, and the mold cavity 213 is formed as a result of the relative arrangement of the parts of the mold-cavity system 200, as the relative placement of the core portion 208, the cavity portion 210, the gate portion 212, etc.

The molded article 103 (depicted as a PET preform) includes a parting line 109 formed as a result of the witness line 224 during the manufacturing of the molded article 103. The molded article 103 also includes a nub portion 107 that was formed as a result of the nub region 214.

FIGS. 5A, 5B, 5C, 5D, 5E depict the additional schematic representations of the mold-cavity system 200 of FIG. 4.

Figure 5A:
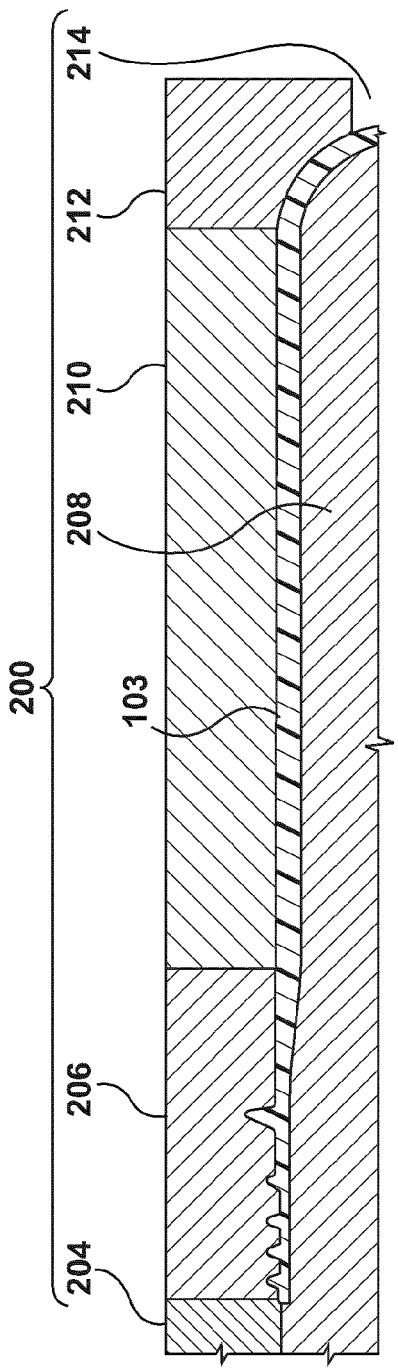

FIG. 5A depicts the schematic representation of the mold-cavity system 200 having the molding material 101 after the gate is shut, and the nub region is beginning to freeze.

Figure 5B:
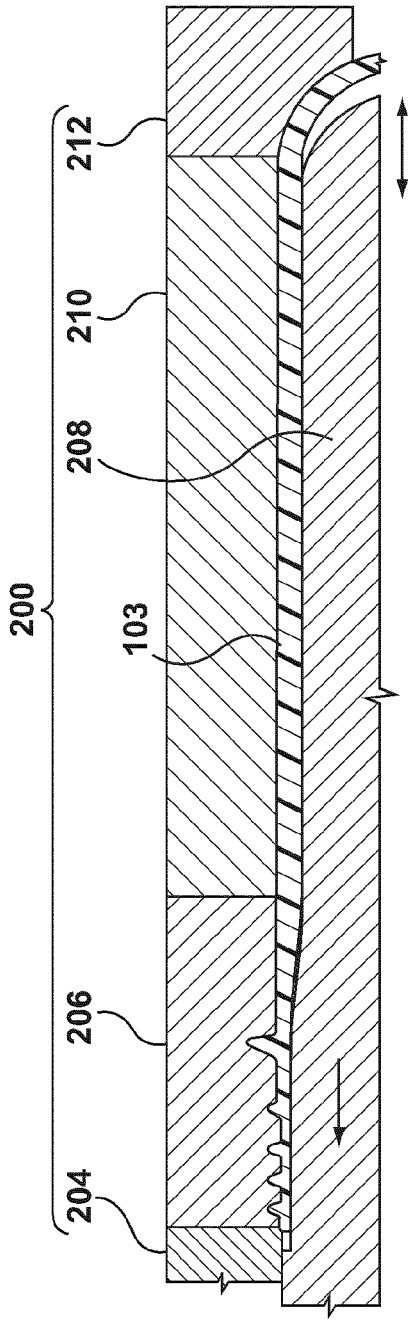

FIG. 5B depicts the schematic representation of the mold-cavity system 200 adjusted to reduce the internal pressure of the molten resin in the mold cavity after the nub region has frozen sufficiently enough. Depicted is an example of how the internal pressure of the molten resin was reduced, which is by moving the core portion 208 to the left side of the FIG. 5B. It should be noted that the actual movement of the core portion 208 is exaggerated in FIG. 5B for illustration purposes. Within certain examples of implementation of embodiments of the present invention, it is expected that the movement can be within about 0.5 mm. In other embodiments of the present invention, the movement can be within about 0.2 mm to about 0.7 mm range. In other applications, the range of movement can be different and can be selected based on some or all of the initial pressure within the molded article 103, volume of the molded article 103 and the desired pressure drop to be obtained by implementing embodiments of the present invention. Once the internal pressure is reduced to a much lower pressure than what is associated with FIG. 5A (preferably zero pressure), the mold-cavity system 200 is opened as soon as possible because the molded article 103 in the mold cavity is still somewhat warm, so it would be advantageous at this time to permit the molded article 103 to be further cooled off by a post-cooling apparatus (not depicted but known).

Figure 5C:
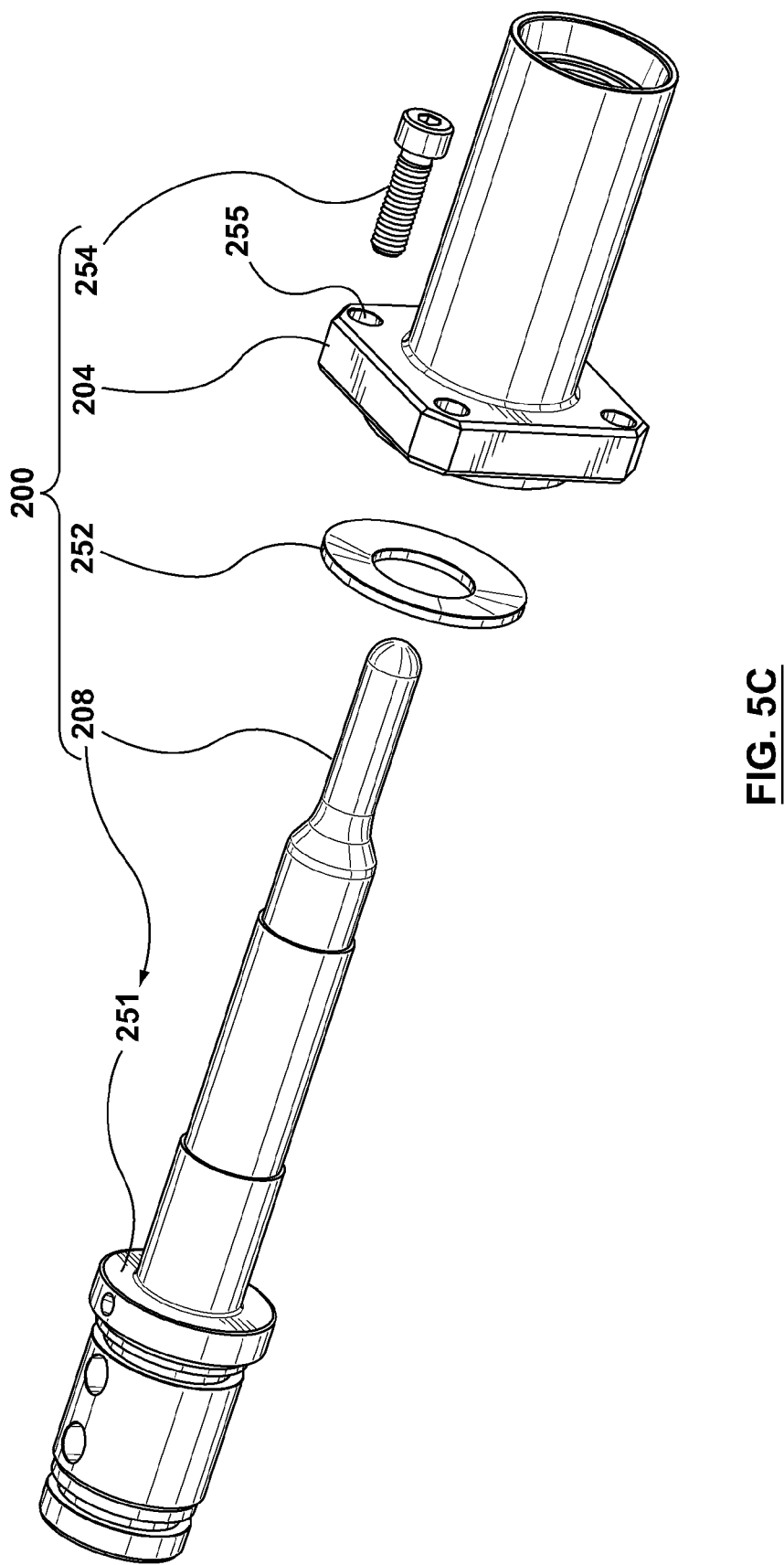
Figure 6C:
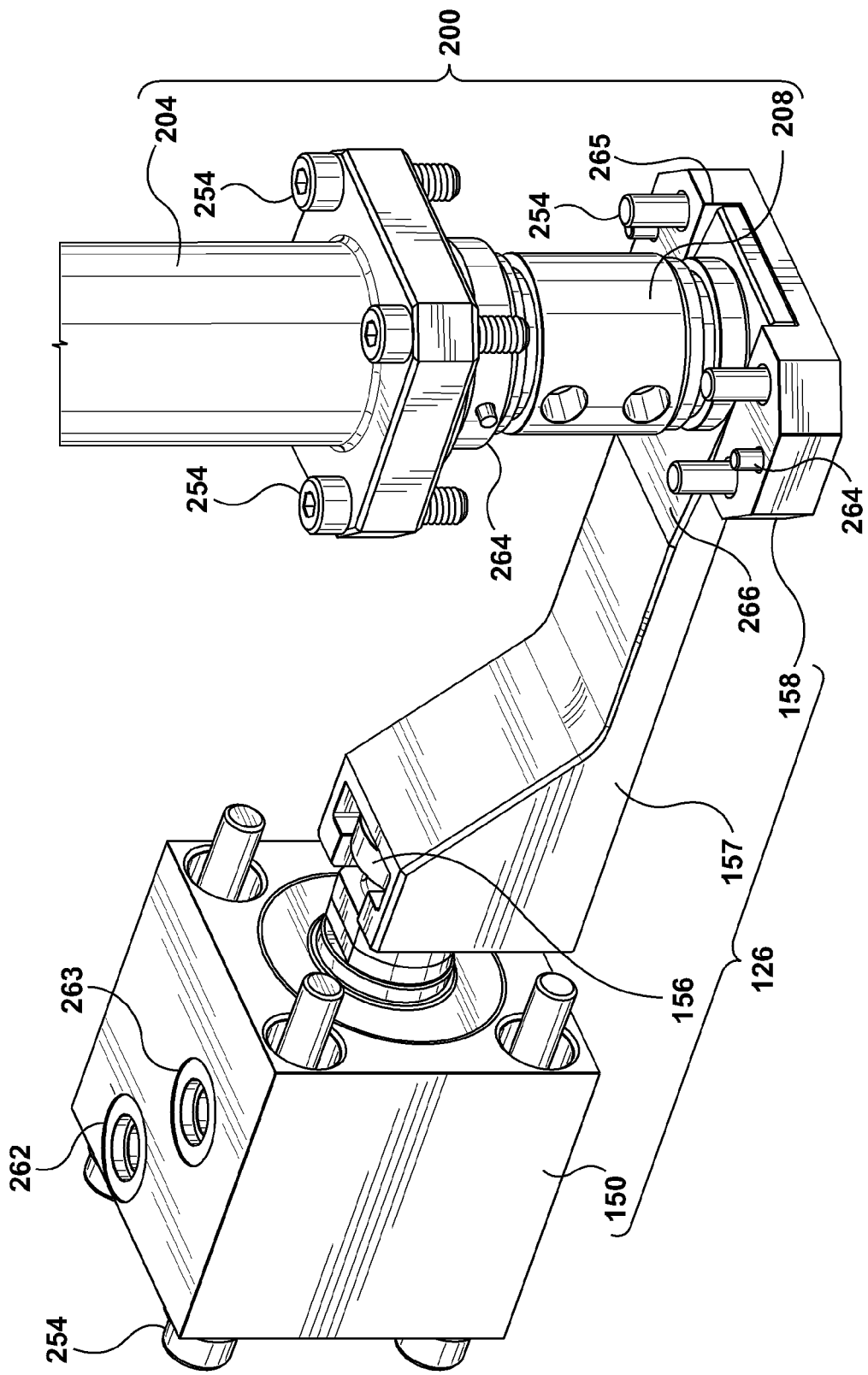

FIG. 5C depicts an exploded perspective view of the mold-cavity system 200 of FIG. 4. The core portion 208 includes a shoulder portion 251 that extends radially outward from a longitudinal axis of the core portion 208. A spring 252 is positioned between the shoulder portion 251 of the core portion 208 and a bottom surface 253 of the top portion 204. For convenience, the spring 252 forms a disk shape with a passageway defined through the central axis of the spring 252, and the central passageway of the spring 252 receives the core portion 208. A bolt 254 is positioned near a mounting bore 255. The bolt 254 is used to mount or couple the top portion 204 to a plate assembly 260 (the plate assembly 260 is depicted in FIG. 6A). In operation, (i) the pressure-control system 126 is used to apply a force to the core portion 208 and the force is large enough to overcome the biasing effect of the spring 252, so that in effect the core portion 208 is actuatably moved or translated toward the top portion 204, and (ii) the pressure-control system 126 stops applying the force to the core portion 208 so that the spring 252 is then used to move the core portion 208 away from the top portion 204. The manner in which the pressure-control system 126 is connected with the core portion 208 is depicted in FIG. 6C.

FIG. 5D depicts a cross-sectional perspective view along the longitudinal axis of the mold-cavity system 200 of FIG. 4. The spring 252 is positioned between the bottom surface 253 of the top portion 204 and the shoulder portion 251 of the core portion 208. The spring 252 abuts the bottom surface 253 of the top portion 204 and the shoulder portion 251 of the core portion 208.

Figure 6D:
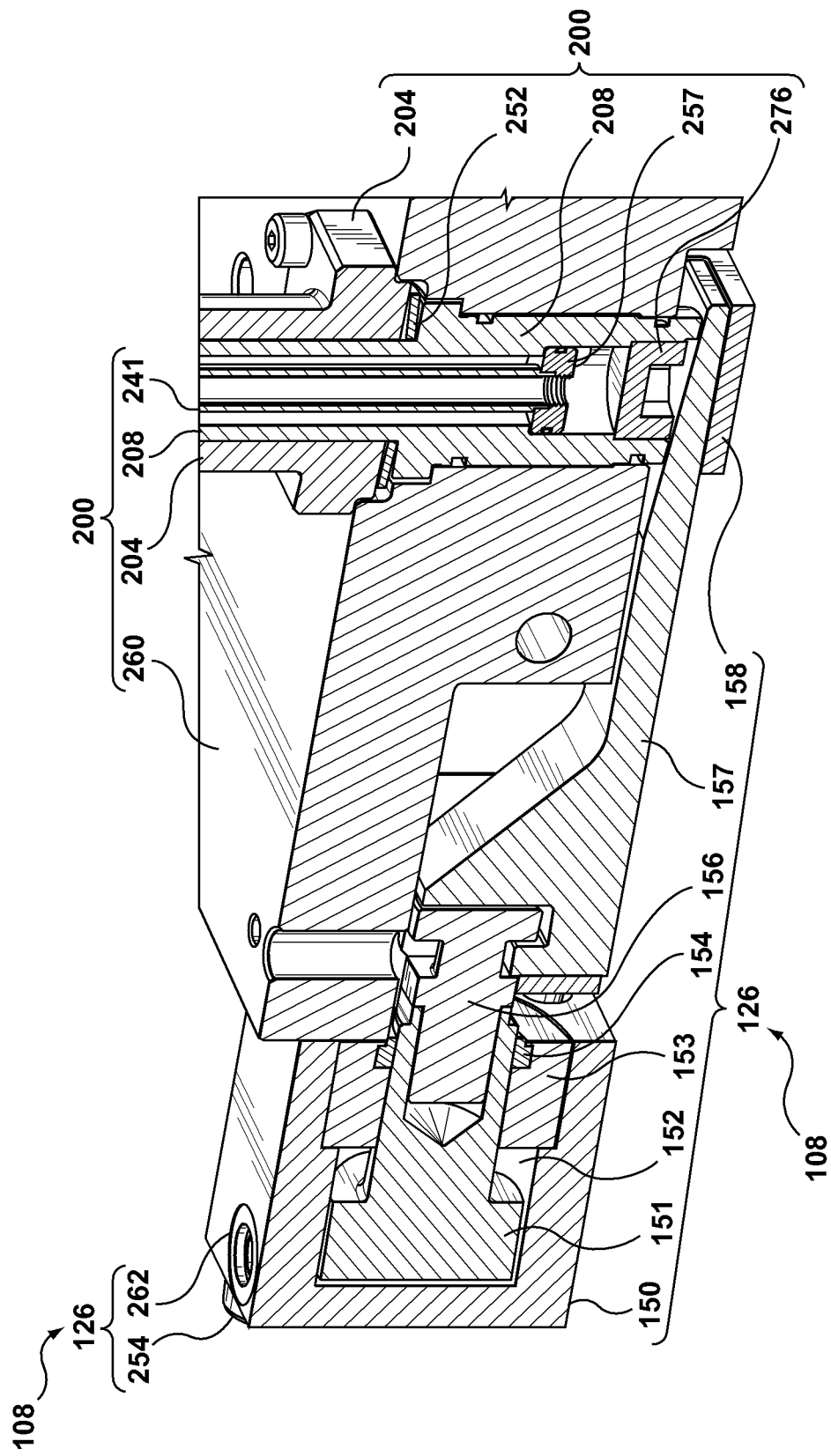

FIG. 5E depicts a cross-sectional view through a longitudinal axis of the core portion 208 of the mold-cavity system 200 of FIG. 4. The core portion 208 includes a bottom face 256 (which is tapered or cammed). The bottom face 256 is used to interface with the pressure-control system 126, which is depicted in FIG. 6D. The core portion 208 defines a tube-receiving bore 258 that is configured or sized to receive the cooling tube 241. The tube-receiving bore 258 securely receives a tube mount 257, and the cooling tube 241 is connected to the tube mount 257. The tube mount 257 securely positions the cooling tube 241 in the tube-receiving bore 258 of the core portion 208. A plug 276 is securely received at the end of the tube-receiving bore 258, and the plug 276 is offset from the tube mount 257. Between the tube-receiving bore 258 and the plug 276 there is a cooling inlet 259 that receives a cooling fluid (such as water), and the cooling fluid is made to flow into the cooling tube 241 and toward a tip 261 (depicted in FIG. 5D) of the core portion 208. By way of example, the bottom face 256 has a five degree taper.

FIGS. 6A, 6B, 6C, 6D, 6E, 6F, 6G depict the schematic representations of the pressure-control system 126 used in the molding system 100 of FIG. 3.

FIG. 6A depicts a perspective view of a top side of the plate assembly 260 of the mold-cavity system 200 of FIG. 4. The top portion 204 is bolted (securely connected) to the plate assembly 260. The plate assembly 260 defines a bore that receives the core portion 208. The tip 261 of the core portion 208 extends outwardly from the plate assembly 260, while a bottom portion of the core portion 208 remains within the bore defined by the plate assembly 260. The pressure-control system 126 is connected to a side edge or a peripheral edge of the plate assembly 260. Depicted in FIG. 6A is a non-limiting example in which two core portions 208 are connected to respective pressure-control systems 126. It will be appreciated that it is possible to adapt or vary the configuration depicted in FIG. 6A such that a single pressure-control system 126 may control two or more core portions 208.

FIG. 6B depicts a perspective view of a bottom side of the plate assembly 260 of the mold-cavity system 200 of FIG. 4. The plate assembly 260 is formed or machined so that the plate assembly 260 accommodates the pressure-control system 126. FIG. 6B depicts the pressure-control system 126. FIG. 6B recessed into the plate assembly 260.

FIG. 6C depicts a perspective view of the pressure-control system 126 of FIG. 6A. For convenience, the plate assembly 260 has been removed so as to permit a clearer view of the pressure-control system 126. The pressure-control system 126 includes: (i) a housing 150, (ii) a link 156, (iii) a wedge 157, and (iv) a coupler 158. The housing 150 defines or provides a housing inlet 262 and a housing outlet 263, both of which are used to receive and expel a hydraulic fluid, respectively. A bolt 254 is used to connect the pressure-control system 126 to the plate assembly 260 (which is depicted in FIG. 6A). The link 156 extends out from the housing 150, and the link 156 connects with the wedge 157. The coupler 158 couples the wedge 157 with the core portion 208 of the mold-cavity system 200. The coupler 158 abuts a surface of the plate assembly 260, and to locate or register the coupler 158 to the plate assembly 260, a locating device 264 (such as a pin) is received by the coupler 158, and the plate assembly 260 includes a bore that also receives the locating device 264. The coupler 158 defines bores that each receives respective bolts 254, and the bolts 254 are used to securely connect the coupler 158 to the plate assembly 260. The coupler 158 defines a wedge-receiving groove 265 that faces the plate assembly 260, and the wedge-receiving groove 265 receives, at least in part, the wedge 157. The wedge 157 presents a surface 266 (which is tapered or cammed) that touches the bottom face 256 (depicted in FIG. 5E) of the core portion 208. The wedge 157 is slidable relative to the bottom face 256 of the core portion 208. it will be appreciated that the wedge 157 and the coupler 158 and the core portion 208 are made of suitable wear-resistant materials. A locating device 264 (also called a pin) extends from the core portion 208. A groove (not depicted) is defined by the plate assembly 260, and the grove slidably receives the locating device 264 that extends from the core portion 208, and the locating device 264 permits linear movement of the core portion 208, and this linear movement is along a direction that is aligned substantially perpendicular relative to the alignment of the wedge 157. The locating device 264 of the core portion 208 permits slidable movement of the core portion 208 relative to the top portion 204 (the top portion 204 is securely connected to the plate assembly 260 depicted in FIG. 6A).

The pressure-control system 126 operates, generally, in accordance with the following approach: in operation, (i) while the mold cavity 213 is being filled, under pressure, with the molding material and before the mold gate 216 is shut, the pressure-control system 126 is actuated so as to apply pressure to the core portion 208, so that the mold cavity 213 maintains a predefined volume. After the mold gate 216 is shut so as to isolate the mold cavity 213 from the stream of molding material, the pressure-control system 126 is deactuated or de-energized so as to remove pressure to the core portion 208, so that the volume of the mold cavity 213 becomes relatively larger and in this manner there is a pressure reduction realized in the mold cavity 213 after the mold gate 216 is shut or closed.

In operation, the pressure-control system 126 operates under the following operational modes: (i) an increase-pressure mode, or (ii) a decrease-pressure mode.

In the decrease-pressure mode, the pressure-control system 126 is actuated so that the link 156 is moved toward the housing 150, and in response the link 156 moves the wedge 157 toward the housing 150, so that the surface 266 of the wedge 157 moves away from the bottom face 256 of the core portion 208, and in this manner the spring 252 (depicted in FIGS. 5C and 5D) pushes the core portion 208 away from the top portion 204. The decrease-pressure mode is enabled or executed after the mold gate 216 (depicted in FIG. 4) is held shut so as to isolate the mold cavity 213 (isolating the mold cavity 213 means that the mold cavity 213 is fluidly disconnected from the melt stream associated with the melt-preparation system 128, which is depicted in FIG. 3), and in this manner the volume of the mold cavity 213 (also depicted in FIG. 4) of the mold-cavity system 200 becomes larger; since (i) the mold gate 216 is held shut during the decrease-pressure mode, and (ii) the volume of the mold cavity 213 is increased, then the pressure in the mold cavity 213 becomes decreased, which is required in accordance with mold-unpack instructions 520 that is depicted in FIG. 7.

In the increase-pressure mode, the pressure-control system 126 is actuated so that the link 156 is moved outwardly of the housing 150, and in response the link 156 moves the wedge 157 away from the housing 150, so that the surface 266 of the wedge 157 moves towards and against the bottom face 256 of the core portion 208, so that the spring 252 becomes compressed because the core portion 208 is urged to move toward the top portion 204.

It will be appreciated that the increase-pressure mode may be used with different instructions of the set of controller-executable instructions 500, which is depicted in FIG. 7, in accordance with the following options:

A first option is to use or enable or execute the increase-pressure mode before the mold gate 216 (depicted in FIG. 4) is shut and while the mold cavity 213 remains not isolated (that is, the mold cavity 213 remains fluidly connected with the melt stream associated with the melt-preparation system 128, which is depicted in FIG. 3); in this manner, the volume of the mold cavity 213 (depicted in FIG. 4) of the mold-cavity system 200 becomes smaller; since (i) the mold gate 216 is held open during the decrease-pressure mode, and the melt-preparation system 128 continues to apply pressure to pack out the mold cavity 213, and (ii) the volume of the mold cavity 213 is decreased, then the pressure in the mold cavity 213 becomes increased, which is required in accordance with a hold instructions 530, which is depicted in FIG. 7. It will be appreciated that the melt-preparation system 128 continues to apply pressure to pack out the mold cavity 213 while the mold cavity 213 remains not isolated (that is, the mold gate 216 is held open for this case) in the following manner, (by way of example): the screw assembly 145 located in the barrel assembly 142 is urged forwardly so as to maintain pressure on the melt located in the mold cavity 213 (since the mold gate 216 is held open for this case), and this arrangement avoids the resin to become pushed back from the mold cavity 213 back into the hot-runner system 300 as a result of the mold gate 216 being held open as the core portion 208 is advanced to reduce the cavity volume of the mold-cavity system 200. It will be appreciated that for this case, there is some other blockage located upstream in the melt stream (to realize a packing process for this case).

A second option is to use or enable or execute the increase-pressure mode after the mold gate 216 (depicted in FIG. 4) is shut and the mold cavity 213 becomes isolated (that is, the mold cavity 213 is fluidly disconnected from the melt stream associated with the melt-preparation system 128, which is depicted in FIG. 3); in this manner, the volume of the mold cavity 213 (depicted in FIG. 4) of the mold-cavity system 200 becomes smaller; since (i) the mold gate 216 is held shut during the decrease-pressure mode, and (ii) the volume of the mold cavity 213 is decreased, then the pressure in the mold cavity 213 becomes increased, which is required in accordance with a mold-volume reduction instructions 540, which is depicted in FIG. 7.

FIG. 6D depicts a perspective cross-sectional view of the pressure-control system 126, which further includes: (i) a hydraulic piston 151, (ii) a chamber 152, (iii) a stop 153, and (iv) a seal 154. The housing 150 receives the hydraulic piston 151. The chamber 152 is defined between the housing 150 and the hydraulic piston 151. The stop 153 is received at one end of the housing 150 so as to limit the travel of the hydraulic piston 151. The seal 154 is received in the end of the housing 150 and the seal 154 is used to prevent leakage of a hydraulic fluid received in the chamber 152. Movement of the core portion 208 occurs within the top portion 204 (also called a lock ring). In accordance with a non-limiting example, the wedge 157 is used to hydraulically actuate movement of the core portion 208 of about 0.8 millimeters (mm).

Figure 6E:
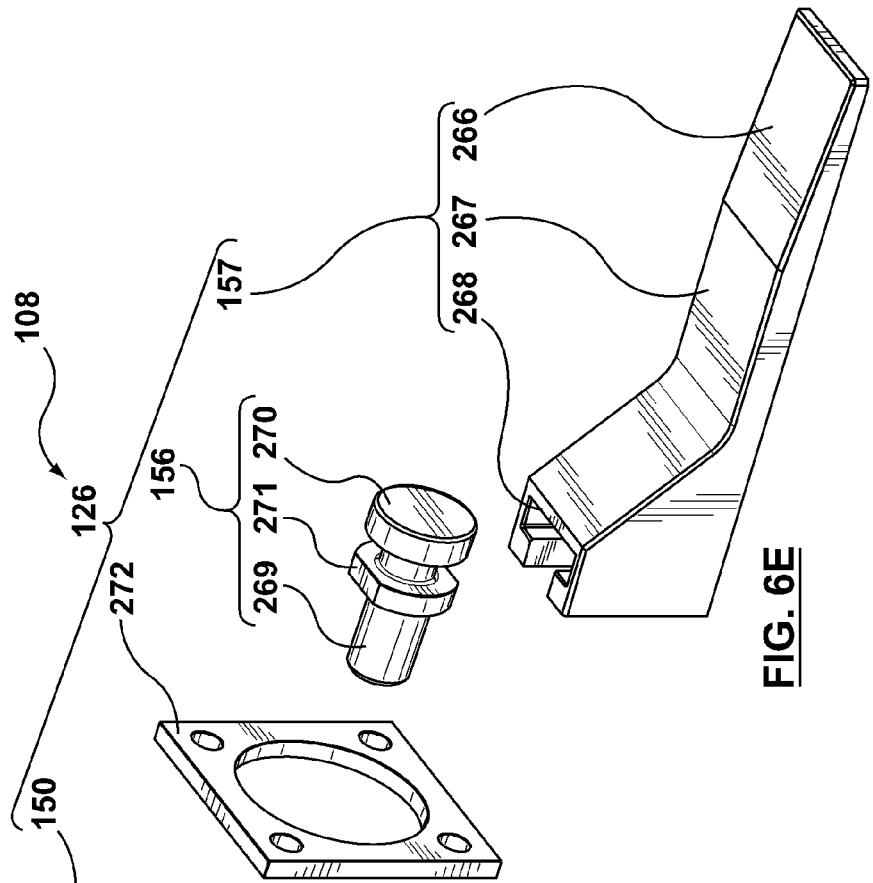

FIG. 6E depicts an exploded perspective view of the pressure-control system 126. The wedge 157 includes a wedge body 267 that provides the surface 266 (which is preferably a tapered surface), and the wedge body 267 defines a wedge groove 268 that is sized so as to receive, at least in part, the link 156. The link 156 includes a link body 269, a link head 270 that extends from the link body 269, and a link shoulder 271 that is offset from the link head 270. The link head 270 is received in the wedge groove 268, in this manner the link 156 is connected with the wedge 157. A housing cover 272 is attached with the housing 150, and the housing cover 272 defines a central passageway that permits the link 156 to be connected with the hydraulic piston 151 (as depicted in FIG. 6F).

Figure 6F:
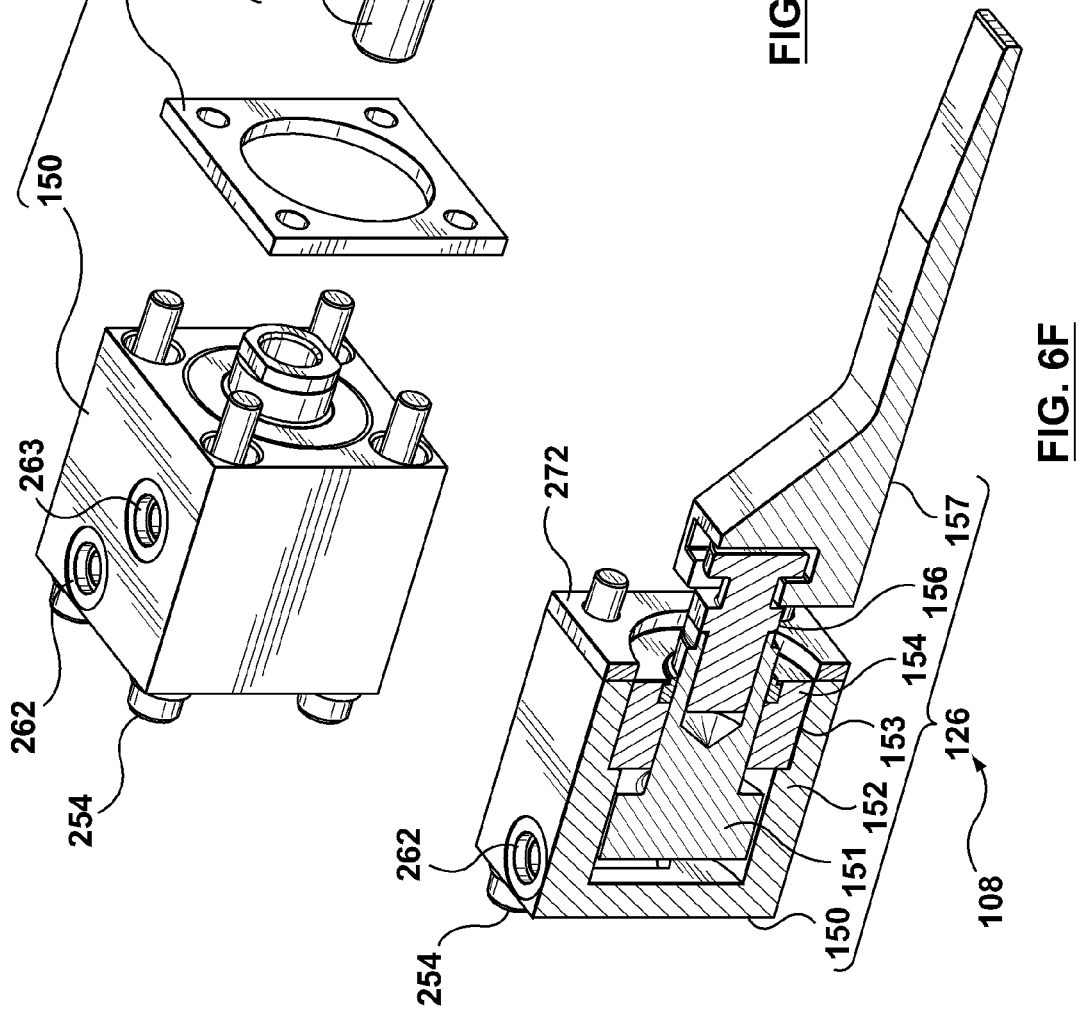

FIG. 6F depicts a cross sectional perspective view of the pressure-control system 126, in an assembled state.

Figure 6G:
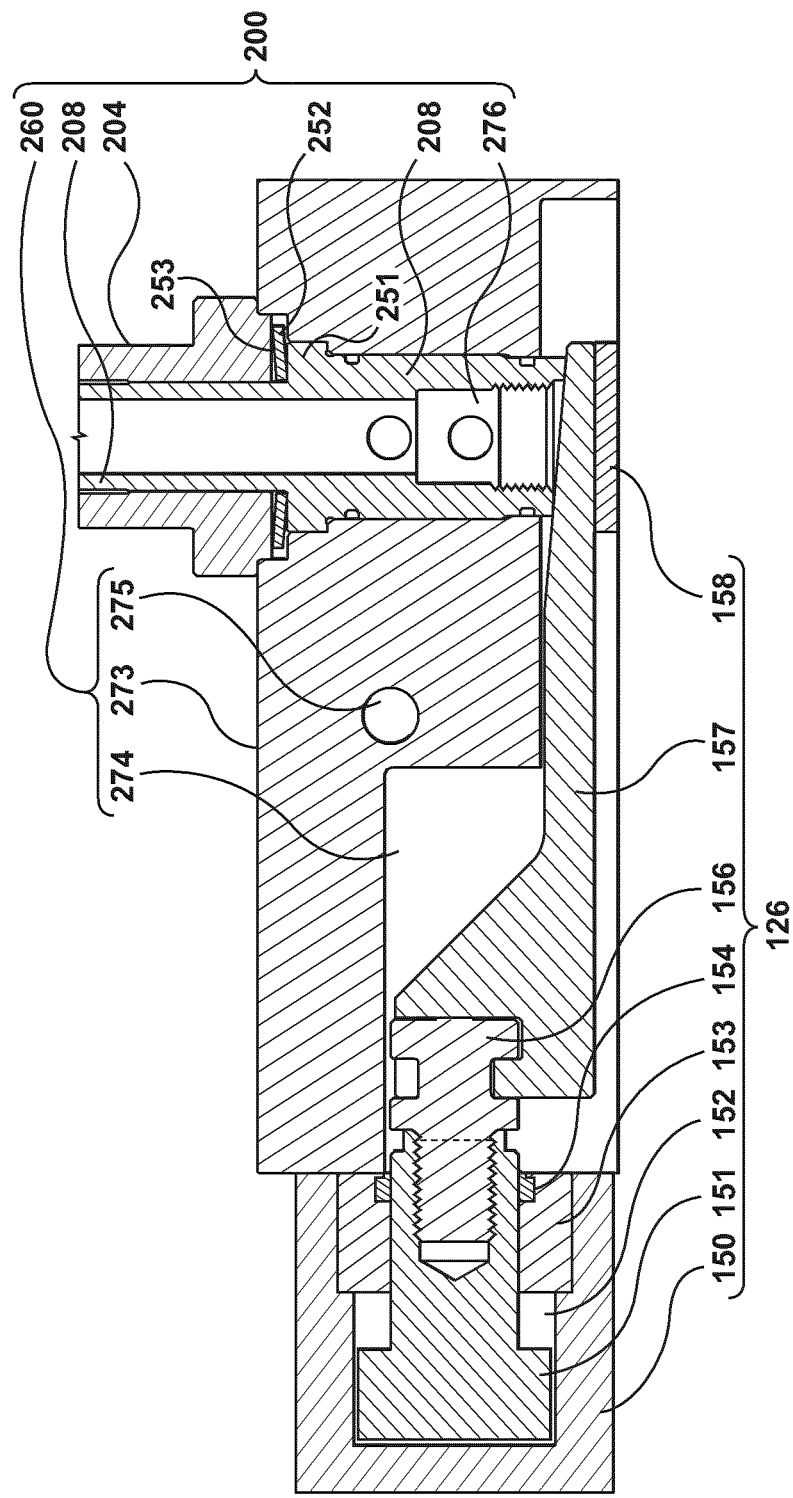

FIG. 6G depicts a partial cross-sectional view of the pressure-control system 126. The plate assembly 260 includes a plate body 273. The plate body 273 defines a cooling circuit 275, which receives a cooling fluid in operation so as to maintain the temperature of the mold-cavity system 200. The plate body 273 also defines a wedge cavity 274 that is configured or sized so as to receive and accommodate the wedge 157 and the pressure-control system 126.

FIG. 7 depicts the schematic representation of the set of controller-executable instructions 500 having instructions for operating the molding system 100 of FIG. 3. The set of controller-executable instructions 500 includes (but is not limited to): mold-unpack instructions 520. The set of controller-executable instructions 500 also includes (but is not limited to) other instructions, such as: (i) melt-preparation instructions 502, (ii) mold-close instructions 504, (iii) mold-lock instructions 506, (iv) tonnage-engage instructions 508, (v) melt-stream connection instructions 510, (vi) mold-injection instructions 512, (vii) mold-pack instructions 514, (viii) melt-stream disconnection instructions 516, (ix) heat-reduction instructions 518, (x) tonnage-disengage instructions 522, (xi) mold-unlock instructions 524 and, (xii) mold-open instructions 526. It will be appreciated that the instructions 500 may be executed either in a parallel manner or a serial manner as known to those skilled in the art of processors.

The melt-preparation instructions 502 include instructing the controller 160 to control the melt-preparation system 128, which is depicted in FIG. 3, to convert the molding material 101 into a stream of flowable-molding material. The melt-preparation instructions 502 may be executed by actuating the melt-preparation system 128 (also called an extruder, etc) having the screw assembly 145 in the barrel assembly 142 that is connected to the hopper 140 configured to receive granules of the molding material 101. The screw assembly 145 rotates in the barrel assembly 142 so as to convert the molding material 101 into the stream of flowable-molding material. The barrel assembly 142 has the machine nozzle 144 connected with the mold-cavity system 200, either via: (i) a hot-sprue apparatus (for the case where a single cavity is to be filled, under pressure, with the stream of flowable-molding material), or (ii) a hot-runner system (for the case where multiple cavities need to be filled, under pressure, with the stream of flowable-molding material). It will be appreciated that the stream of flowable-molding material does not flow in a continuous manner but in an intermittent (on and off) manner.

The mold-close instructions 504 include instructing the controller 160 to control the platen actuator 120, which is depicted in FIG. 3, to move the movable platen 104 toward the stationary platen 102 thereby shutting the mold-cavity system 200 in a closed or shut state, and once closed the mold-cavity system 200 defines the mold cavity 213.

The mold-lock instructions 506 include instructing the controller 160 to control the bar locks 121, which are depicted in FIG. 3, to lock the movable platen 104 and the platen bars 106 so that the mold-cavity system 200 is locked, and in effect the portions of the mold-cavity system 200 do not move relative to each other when the mold-cavity system 200 is injected, under pressure, with the stream of flowable-molding material. The mold-lock instructions 506 may be executed by engaging the bar locks 121 so that the platens 102, 104 do not move relative to each other; specifically, this arrangement may be achieved, for example, by locking the platen bars 106 to the movable platen 104.

The tonnage-engage instructions 508 include instructing the controller 160 to control the clamp assemblies 122 (depicted in FIG. 3) to apply the clamp tonnage to the mold-cavity system 200 via the platen bars 106 after the mold-cavity system 200 is closed shut and locked. The tonnage-engage instructions 508 may be executed by pressurizing the clamp assemblies 122 to apply the clamp tonnage to the mold-cavity system 200 via the platens 102, 104 and the platen bars 106.

The melt-stream connection instructions 510 include instructing the controller 160 to control the melt-preparation system 128 (depicted in FIG. 3) to connect the mold-cavity system 200 to the stream of flowable-molding material, so that the stream of flowable-molding material may flow into the mold-cavity system 200. The melt-stream connection instructions 510 may be executed by opening the mold gate 216 leading into the mold-cavity system 200.

The mold-injection instructions 512 include instructing the controller 160 to control the melt-preparation system 128 (depicted in FIG. 3) to inject a portion of the stream of flowable-molding material into the mold-cavity system 200 while the clamp tonnage maintains the mold-cavity system 200 closed. The mold-injection instructions 512 may be executed by translating the screw of the screw assembly 145 of the melt-preparation system 128 toward the stationary platen 102.

The mold-pack instructions 514 include instructing the controller 160 to control any one of the following options: (option i) the melt-preparation system 128, which is depicted in FIG. 3, or (option ii) the melt-preparation system 128 and the pressure-control system 126 (depicted in FIG. 3) to apply an additional pressure to the molding material 101 contained in the mold-cavity system 200 while the molding material 101 becomes cooled, at least in part, in the mold-cavity system 200. The mold-pack instructions 514 are executed while the mold gate 216 is open (specifically, the mold-pack instructions 514 are executed before the mold gate 216 is closed). The purpose of the mold-pack instructions 514 is to compensate for shrinkage of the molding material held in the mold cavity 213 as a result of the molding material cooling down. For option (i), the melt-preparation system 128 applies the additional pressure to the molding material 101 contained in the mold-cavity system 200 while the mold gate 216 is held open by forcing the screw assembly 145 to apply additional pressure to the molding material. For option (ii), both the melt-preparation system 128 and the pressure-control system 126 to apply the additional pressure to the molding material 101 contained in the mold-cavity system 200 while the mold gate 216 is held open.

The melt-stream disconnection instructions 516 include instructing the controller 160 to control the melt-preparation system 128 (depicted in FIG. 3) to disconnect the mold-cavity system 200 from the stream of flowable-molding material; in this manner the mold-cavity system 200 becomes isolated from the stream of flowable-molding material after the mold-cavity system 200 has received the portion of the stream of flowable-molding material (and the molding material in the mold cavity 213 has been packed in before the mold gate 216 is closed). The melt-stream disconnection instructions 516 may be executed by closing the mold gate 216 by using gate valves, gate nozzles, etc.

The heat-reduction instructions 518 include instructing the controller 160 to control the mold-cooling system 124 (depicted in FIG. 4) to remove heat from the molding material 101 received in the mold-cavity system 200 after the mold-cavity system 200 has been disconnected from the stream of flowable-molding material (so that the mold-cavity system 200 becomes isolated from the stream of flowable-molding material); in response to the above instruction, solidification of the molding material 101 occurs in a gate portion 212 of the mold-cavity system 200 so that the molded article 103 may be removed from the mold cavity 213 of the mold-cavity system 200.

The mold-unpack instructions 520 include instructing the controller 160 to control the pressure-control system 126 to reduce, after solidification, at least in part, of the molding material 101 that is located in a nub region 214 of the mold-cavity system 200, internal pressure of the molding material 101 that is received in the mold-cavity system 200 while the mold-cavity system 200 remains isolated from a stream of flowable-molding material. The reduction of the internal pressure of the molding material 101 that is received in the mold-cavity system 200 while the mold-cavity system 200 remains isolated from the stream is beyond any reduction of the internal pressure in the molding material 101 resulting from cooling of the molding material 101. The technical effect is that the reduction in the internal pressure of the molding material 101 is enough to permit safe opening of the mold-cavity system 200 while permitting safe extraction of the molded article 103 from the mold-cavity system 200.

Figure 8A:
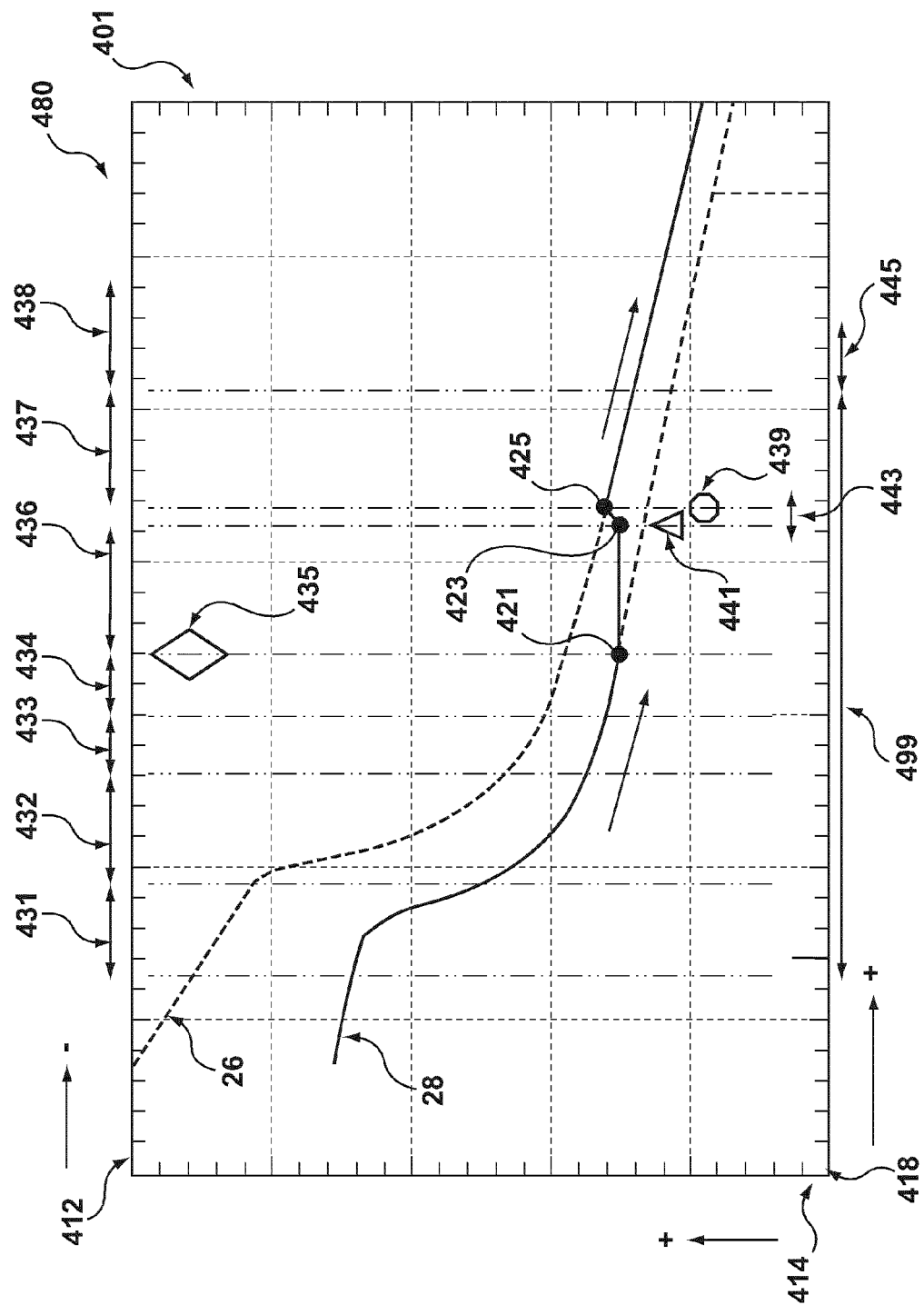

The mold-unpack instructions 520 include instructing the controller 160 to control the pressure-control system 126 (depicted in FIG. 6) to reduce, after solidification, at least in part, of the molding material 101 located in a nub region 214 of the mold-cavity system 200, internal pressure of the molding material 101 received in the mold-cavity system 200 beyond any reduction of the internal pressure in the molding material 101 as a result of cooling of the molding material 101; the reduction in the internal pressure of the molding material 101 is enough to permit safe opening of the mold-cavity system 200. It will be appreciated that the mold-unpack instructions 520 may be executed once the nub region 214 has solidified sufficiently enough and the molded article 103 may be solidified sufficiently enough so as to be conveniently removed from the mold-cavity system 200. If the mold-unpack instructions 520 are executed before the molded article 103 has had sufficient time to cool down, it may be too difficult to remove the molded article 103 article from the mold cavity 213 because the molded article 103 has not become solidified enough for handling (that is, removal from the mold cavity 213). The mold-unpack instructions 520 may be executed in accordance with an aggressive manner (as depicted in FIG. 8B) or in accordance with a relaxed manner (as depicted in FIG. 8A), depending on the specifics of the geometry of the molded article 103, the mold-cavity system 200, the molding system 100, etc. It is recommended to use a trial and error approach to find the most appropriate time to begin execution of the mold-unpack instructions 520.

The tonnage-disengage instructions 522 include instructing the controller 160 to control the clamp assemblies 122 (depicted in FIG. 3) to disengage the clamp tonnage from the mold-cavity system 200. The tonnage-disengage instructions 522 may be executed by to disengaging or depressurizing the clamp assemblies 122 so as to stop application of the clamp tonnage to the mold-cavity system 200 via the platens 102, 104 and the platen bars 106.

The mold-unlock instructions 524 include instructing the controller 160 to control the bar locks 121 (depicted in FIG. 3) to unlock the movable platen 104 and the platen bars 106 so that the mold-cavity system 200 may be unlocked. The mold-unlock instructions 524 may be executed by unlocking the bar locks 121 so that the platens 102, 104 can be moved relative to each other so as to separate the mold-cavity system 200 (and thus be able to remove the molded article 103 from the mold-cavity system 200).

The mold-open instructions 526 include instructing the controller 160 to control the movable platen 104 (depicted in FIG. 3) to away from the stationary platen 102 thereby open the mold-cavity system 200, so that a molded part made in the mold-cavity system 200 may be removed from the mold-cavity system 200 (either manually or by robot assembly, which is not depicted but known).

FIG. 7 also depicts a first non-limiting variation 590 of the set of controller-executable instructions 500: variations may be made to: (i) the mold-pack instructions 514, (ii) the melt-stream disconnection instructions 516, and (iii) the mold-unpack instructions 520. Specifically, the mold-pack instructions 514 may be varied so as to further include: hold instructions 530, and compensation instructions 531.

In accordance with the first non-limiting variation 590, the hold instructions 530 include instructing the controller 160 to control the molding system 100 to apply and hold the pressure to the molding material 101 being contained in the mold-cavity system 200 while the molding material 101 remains in a semi-solid state in the mold-cavity system 200; the hold instructions 530 may be executed by using the screw assembly 145 and maintaining the mold gate 216 open.

In accordance with the first non-limiting variation 590, the compensation instructions 531 include instructing the controller 160 to control the molding system 100 to inject an additional amount of the molding material 101 into the mold-cavity system 200 while the molding material 101 in the mold-cavity system 200 remains in the semi-solid state; the additional amount of the molding material 101 compensates for shrinkage of the molding material 101 received in the mold-cavity system 200; the compensation instructions 531 may be executed by using the screw assembly 145, and keeping the mold gate 216 open; the compensation instructions 531 are executed during the hold cycle. The hold cycle is used to compensate for density change of the molding material 101 by adding molding material 101, under the pressure, and permitting freezing of the nub portion 107 of the molded article 103. The nub portion 107 is also called the "melt injection point".

In accordance with the first non-limiting variation 590, the melt-stream disconnection instructions 516 are executed: (i) after the mold-pack instructions 514 are executed so that the mold-cavity system 200 becomes isolated from the stream of flowable molding material, and (ii) before the mold-unpack instructions 520 are executed.

In accordance with the first non-limiting variation 590, the mold-unpack instructions 520 further include: mold-volume increase instructions 532. The mold-volume increase instructions 532 include instructing the controller 160 to control the pressure-control system 126 of the molding system 100 to increase the volume of the mold cavity 213 of the mold-cavity system 200. Increasing the volume of the mold cavity 213 reduces the pressure within the molding material 101 received in the mold-cavity system 200 while: (i) the molding material 101 remains in the semi-solid state in the mold-cavity system 200, and (ii) the mold cavity 213 remains isolated from the stream of the molding material; an internal pressure of the molded article 103 is relieved by increasing effective volume of the mold cavity 213, and a reduction of the pressure is accomplished by waiting for the molded article 103 to cool and actively increasing the volume of the mold cavity 213. The result is a reduction in cycle time instead of waiting for the molded article 103 to shrink and cool off in the mold cavity 213. This arrangement provides an opportunity to decrease the pressure by allowing the volume of the mold cavity 213 to increase.

FIG. 7 also depicts a second non-limiting variant 592 of the set of controller-executable instructions 500: variations may be made to: (i) the melt-stream disconnection instructions 516, (ii) the mold-pack instructions 514, and (iii) the mold-unpack instructions 520.

In accordance with the second non-limiting variant 592, the melt-stream disconnection instructions 516 are executed: (i) before the mold-pack instructions are executed, and (ii) before the mold-unpack instructions 520 are executed.

In accordance with the second non-limiting variant 592, the mold-pack instructions 514 further include mold-volume reduction instructions 540. The mold-volume reduction instructions 540 include instructing the controller 160 to control the pressure-control system 126 to decrease a volume of the mold cavity 213, so that the additional pressure is applied to the molding material 101 received in the mold-cavity system 200 while the molding material 101 remains in a semi-solid state in the mold-cavity system 200, so that a size of the volume of the mold cavity 213 is reduced and the molding material 101 located in the mold cavity 213 is compressed, so that density of the molding material 101 located in the mold-cavity system 200 increases. This arrangement may be accomplished, for example, by moving the core portion 208 toward the mold gate 216, or other suitable mechanism, such as the mechanisms described in U.S. Pat. No. 7,293,981.

In accordance with the second non-limiting variant 592, the mold-unpack instructions 520 further include: mold-volume increase instructions 542. The mold-volume increase instructions 542 include instructing the controller 160 to control the pressure-control system 126 to increase the volume of the mold cavity 213, so that an internal pressure of the molding material 101 contained in the mold-cavity system 200 is reduced while the molding material 101 remains in the semi-solid state in the mold-cavity system 200, so that the molding material 101 located in the mold-cavity system 200 becomes decompressed and the density of the molding material 101 decreases by expanding the volume of the mold cavity 213 before the mold-cavity system 200 is opened sufficiently so as to remove the molded article 103 and while the mold-cavity system 200 remains isolated from the stream of the molding material 101. For example, this arrangement may be executed by having the core portion 208 moving away from the mold gate 216 by using the mechanism described in U.S. Pat. No. 7,293,981.

Figure 2:
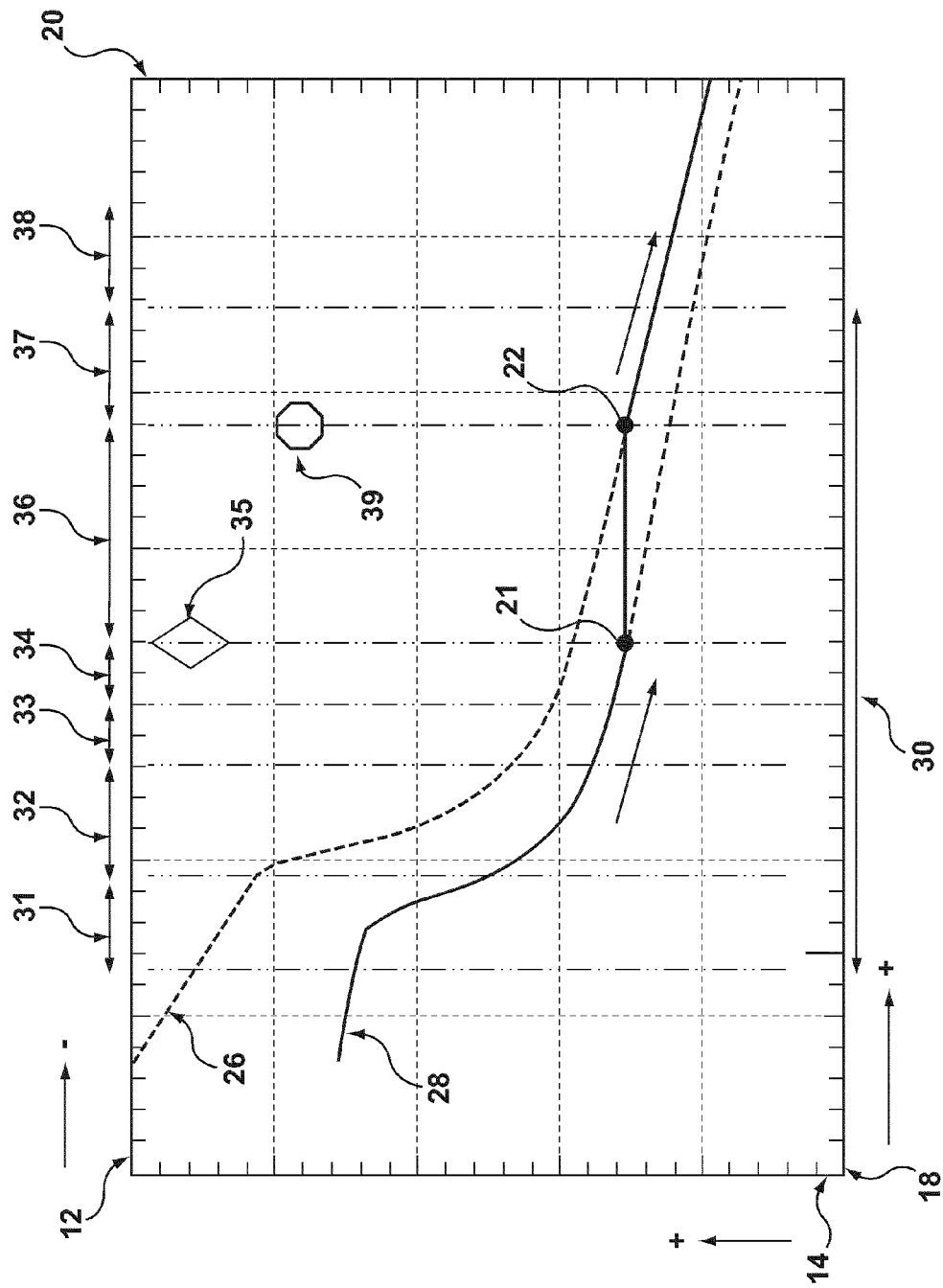
FIG. 2 depicts the schematic representation of the graph 20 having the known cycle time 30 superimposed on the modified PVT curves 26, 28 of the PET resin of FIG. 1.

FIGS. 8A and 8B depict schematic representations of graphs 401 and 501, respectively, having a cycle time 499 and a cycle time 599, respectively, superimposed on modified PVT curves 26, 28 of the PET resin of FIG. 2.

FIG. 8A depicts an example of using the set of controller-executable instructions 500 of FIG. 7. The graph 420 has a molding operation 480 superimposed on the modified PVT curves 26, 28 of FIG. 2. It will be appreciated that the graph 420 depicts flipped versions of the known PVT curves 16, 18 depicted in FIG. 1. Specifically, the modified PVT curves 26, 28 of FIG. 8A are the flipped versions (that is, flipped side to side) of the known PVT curves 16, 18 of FIG. 1, respectively. The arrangement depicted in FIG. 8A permits the depiction of time as increasing from the left side to the right side of the graph 420, and that the cycle of the molding system 100 may be better understood when time is depicted in this fashion. The graph 420 includes a time axis 418 aligned along a horizontal direction of the graph 420 (that is, located along the bottom side of the graph 420) and increasing from the left side to the right side of FIG. 2. The graph 420 also includes the specific volume axis 414 aligned along a vertical direction of the graph 420 (that is, located on the left side of the graph 420), and increasing from the bottom side to the top side of FIG. 2. The graph 420 also includes the temperature axis 412 aligned the horizontal direction of the graph 420 (that is, located along the top side of the graph 420), and increasing from the right side to the left side of FIG. 2.

Along the top of the graph 420 there is depicted the operations of the molding system 100 of FIG. 1. An operation 430 of the molding system 100 includes (more or less): an operation 431, an operation 432, an operation 433, an operation 434, an operation 435, an operation 436, an operation 437, and an operation 438. The operations 431 to 438 are depicted along the top side of FIG. 8A. The modified PVT curve 28 is used to describe the characteristics of the known PET resin during the operations 431, 432, 433, 434 and 435.

The operation 431 includes closing a mold cavity. The operation 432 includes locking the mold cavity shut and pressurizing a clamp assembly so as to apply clamp tonnage to the mold assembly. The operation 433 includes injecting melted resin into the mold cavity volume of the mold assembly; it will be appreciated that the operation 433 is sometimes known as the "fill" cycle. The operation 434 includes slowly adding the melted resin to maintain a full cavity volume; it will be appreciated that the operation 434 is also known as the "hold" cycle. The operation 434 provides compensation for the pressure change of the melt in the mold cavity as the temperature drops for the molding material; specifically, as the temperature drops the tendency is for the pressure to drop but the operation 434 is used to increase of the density of the molten resin during the operation 434. Typically, at the end of the hold cycle or the operation 434, the operation 435 is executed; the operation 435 includes shutting off the mold cavity or isolating the mold cavity; the operation 435 is sometimes referred to as the "shut-off cycle".

The operation 435 includes moving a valve stem into a mold gate that leads into the mold cavity, and the valve stem is used to stop further movement of the molten resin into and out from the mold cavity (via the mold gate); when sufficient plastic density change has occurred, the molded part can be cooled down and removed from the mold cavity without, ideally, the molded article suffering from shrinkage related deformation. The operation 435 occurs at a point 421. The characteristics of the PET resin during operation 436 are described by a horizontally aligned line extending between a point 421 and a point 423. The point 423 is the point at which the mold-unpack instructions 520 are executed (so that the pressure in the mold cavity 213 is reduced after the mold gate 216 is closed and the mold cavity 213 is isolated form the stream of molding material). The specific volume of the molding material located inside the mold cavity 213 will now increase from point 423 to point 425 (as a result of the reduction in pressure). The point 421 and the point 425 represent terminus points for a beginning and an ending of the operation 436. The horizontal line (that extends between the point 421 and the point 423) is used is because a volume of the mold cavity 213 does not increase or decrease during this portion of the operation 436, and therefore the volume of the molten resin in the mold cavity does not change during this portion of the operation 436. However, between the point 423 and the point 425 the pressure in the mold cavity 213 is decreased during this portion of the operation 436 (in sharp contrast to the operation 36 of FIG. 2). At a region 441 the nub portion 107 of the molded article 103 is considered to be solidified enough so as to permit safe removal of the molded article 103 from the mold cavity 213 (the molded article 103 is removed in a hot condition from the mold cavity 213). At a region 439, the internal pressure of the molded article 103 is near or at zero pressure, so that unlocking of the bar locks 121 would not cause the mold-cavity system 200 to inadvertently pop open (thus avoiding potential damage to the mold-cavity system 200).

The modified PVT curve 26 is used to describe the characteristics of the known PET resin during the operation 437 and the operation 438. The operation 437 includes depressurizing a clamp assembly and unlocking a mold assembly. Since the internal pressure of the resin in the mold cavity has reduced to near zero or preferably zero pressure, there is little or no danger of popping open the mold assembly (this is the preferred situation so that the mold assembly is not inadvertently damaged by allowing it to pop open under pressure). The operation 438 includes removing the molded article formed in the mold cavity, and then passing the molded article to a post mold cooling apparatus for further temperature reduction if so desired.

The cycle time 499 is depicted along the time axis 418, and it will be appreciated that the cycle time 499 is less than the known cycle time 30 depicted in FIG. 2. It will be appreciated that the PVT curves and the cycle time 499 are not accurately drawn, but were drawn for illustrative purposes for ease of explaining the concepts. Time 445 represents the amount of time saved or reduced in the cycle time in comparison to the known cycle time 30 of FIG. 2. It will be appreciated that the amount of time 443 (that is, the mold unpack time) used during the mold-unpack instructions 520 can vary in accordance to the conditions that may be required to ensure production of a molded article 103.

FIG. 8B represents a cycle time 599 (that is considered to be more aggressive than the cycle time depicted in FIG. 8A) corresponding with an aggressive cycle operation 580 for the molding system 100 of FIG. 1. The points 521, 523 and 525 correspond with the points 421, 423 and 425 of FIG. 8A, respectively. The point 523 is moved closer to the point 521 (while the point 423 is further away from the point 421, in relative terms). Similarly, the point 525 is moved closer to the point 521 (while the point 425 is further away from the point 421, in relative terms). It will be appreciated that under the scenario depicted in FIG. 8B, the molded article 103 removed from the mold cavity 213 will be hotter than the molded article 103 moved out from the mold cavity 213 under the scenario depicted in FIG. 8A. The cycle time 599 is depicted along the time axis 519, and it will be appreciated that the cycle time 599 is less than the cycle time 499 depicted in FIG. 8A. Time 545 represents the amount of time saved or reduced in the cycle time in comparison to the known cycle time 30 of FIG. 2. It will be appreciated that the amount of time 543 used during the mold-unpack instructions 520 can vary in accordance to the conditions that may be required to ensure production of a molded article 103.

With reference to FIGS. 9A and 9B another non-limiting embodiment of the present invention will be described. FIG. 9A depicts a schematic representation of the mold-cavity system 200 having the molding material 101 after the gate is shut, and the nub region is beginning to freeze. The mold-cavity system 200 can be said to depict two parting lines (amongst others) between various components of a molding stack forming the mold-cavity system 200. More specifically, there can be said to be a "primary parting line" which is depicted as the witness line 224, discussed in greater detail herein above. There is also depicted a "secondary parting line" depicted as the parting line 222, also discussed herein above. Accordingly, it can be said that within the depiction in FIGS. 9A and 9B, the primary parting line is defined between the cavity portion 210 and the neck portion 206 and the secondary parting line is defined between the neck portion 206 and the top portion 204.

FIG. 9B depicts the mold-cavity system 200 during initial stages of a mold open operation. Generally speaking, the initial stages of the mold open operation occur at the end of the so-called "process portion" of the molding cycle, which generally includes filling, holding and cooling operations. As such, the initial stages of the mold open operation can be implemented at the end of the in-mold cooling cycle or, in other words, at the end of the molding cycle when the mold-cavity system 200 is ready to be opened.

More specifically, it can be seen that during the initial stages of the mold open operation (but prior to unclamping of the mold-cavity system 200 or, put another way, while maintaining at least some of the clamping force), the stack components of the mold-cavity system 200 are first separated relative to the secondary parting line, while the primary parting line is kept un-opened.

More specifically, prior to the release of clamp tonnage (i.e. while maintaining at least some of the clamp force), the controller 160 can activate an ejector actuator (not depicted), which is configured to actuate a stripper assembly (not depicted) to which the neck portion 206 of the mold-cavity system 200 is coupled to. As is known to those of skill in the art, the ejector actuator can include push-pull or push rods, coupled to suitable actuation structures. Within the embodiments of the present invention, during the initial stages of mold opening, the primary parting line can be kept un-opened by urging the neck portion 206 towards the cavity portion 210, which can be achieved by activating ejector actuator to urge the neck portion 206 towards the cavity portion 210. It is noted that within these embodiments of the present invention, the ejector actuator has to exert enough force to keep the neck portion 206 urged towards the cavity portion 210. It is also noted that the ejector actuator is actuated while at least a portion of the clamp force is still being applied.

Within the architecture of FIGS. 9A and 9B, it is possible to implement a non-limiting embodiment of a method for opening the mold-cavity system 200. It will be recalled that the controller 160 (schematically depicted in FIG. 9B, but which can be implemented similarly to the illustration in FIG. 3) houses the controller-usable memory 162 tangibly embodying a set of controller-executable instructions 500 being configured to direct the controller 160.

Within these embodiments, the set of controller-executable instructions 500 includes a mold-open instruction 902. The mold-open instruction 902 is configured to cause activation of the ejector actuator to urge the neck portion 206 towards the cavity portion 210, such that to urge the neck portion 206 towards the cavity portion 210 in order to keep the primary parting line un-opened. The mold-open instruction 902 is further configured to cause the mold-moving actuator (not depicted) to cause the clamp to reduce and/or cease applying clamp force.

It is noted that in some embodiments of the present invention, the actions of activation of ejector actuator and ceasing application of the clamp force can be triggered substantially simultaneously. In other embodiments, one can be triggered after another, as long as the ejector actuators are actuated and are capable of applying sufficient force to urge neck portion 206 towards the cavity portion 210 at the point in time when the clamp force falls below the plastic pressure in the molded article 103 (i.e. before clamp force falls under plastic pressure value that is sufficient to cause the mold-cavity system 200 to open relative to the primary parting line if the neck portion 206 was not being urged towards the cavity portion 210).

At a point in time thereafter and, more specifically, at the point in time when the clamp force is reduced sufficiently to enable safe opening of the mold-cavity system 200, the mold-open instruction 902 is further configured to cause the mold-cavity system 200 to open vis-à-vis the primary parting line in a normal fashion to implement removal of the molded article 103 from the mold-cavity system 200. This, in turn, can be implemented by either (a) de-activation in case of push rods or (b) activation in an opposite direction in case of the push pull rods of the ejector actuator, to urge the neck portion 206 away from the cavity portion 210, at which point standard operation of the neck portion 206 can be implemented, i.e. lateral opening of the split mold inserts forming the neck portion 206 by use of cams, servo motors or other suitable actuators. A technical effect of these embodiments of the present invention may include fewer part defects attributable to the mold-opening function. Another technical effect of these embodiments of the present invention may include reduction of the internal pressure associated with the molded article 103.

Even though embodiments of the present invention have been described with reference to actuating of ejector actuators, this needs not be so in every embodiment of the present invention. For example, in an alternative embodiment of the present invention, a separate actuator (not depicted) can be used to urge neck portion 206 towards the cavity portion 210. An example of such a separate actuator may include, for example, an actuator based on active material (such as piezo-electric actuator, an example of which is described in co-owned U.S. Pat. No. 7,293,981 issued to Niewels on Nov. 13, 2007.

Within non-limiting embodiments described above, it is contemplated that the core portion 208 can be moved away from the cavity portion 210 in order to execute various embodiments of the present invention. The degree of such movement will vary, depending on the specific implementation. However, what is noteworthy is that the degree of movement within previously described embodiments is such that only some molecules of the plastic of the molded article 103 that abut with the core portion 208 will move relative to the core portion 208, while others of the molecules of the plastic of the molded article 103 that abut with the core portion 208 will not move or, in a sense, they "stick" in their relative position on the core portion 208.

In alternative non-limiting embodiments of the present invention, it is contemplated that the core portion 208 can be moved away from the cavity portion 210 by a distance sufficient to displace the totality of molecules of the plastic of the molded article 103 that abut with the core portion 208 from their relative positioning during the process cycle, the displacement being in substantially the same direction. This movement can be executed while maintaining at least some of the clamping force. For the avoidance of doubt, by term "maintaining at least some clamping force" inventors contemplate maintaining clamping force such that the sum of the clamping force and the friction between the molded article 103 and the core portion 208 is less than the ejector force (i.e. force exerted by the ejector actuator).

Figure 10A:
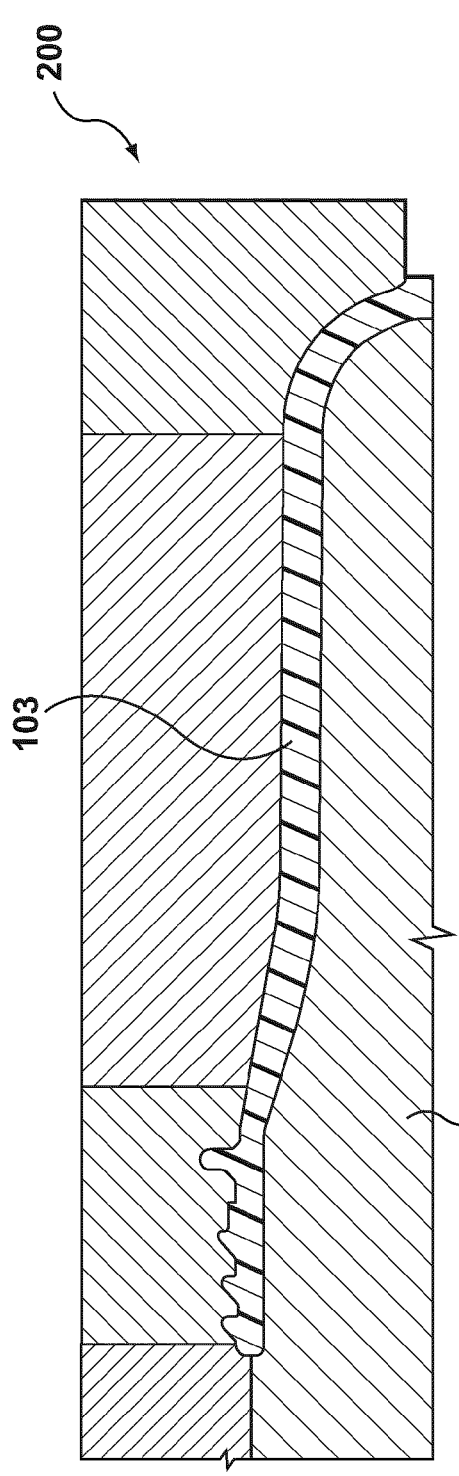
FIGS. 10A and 10B are schematic representations of the mold cavity system, depicting the effect of executing the pre-eject function.
Figure 10B:
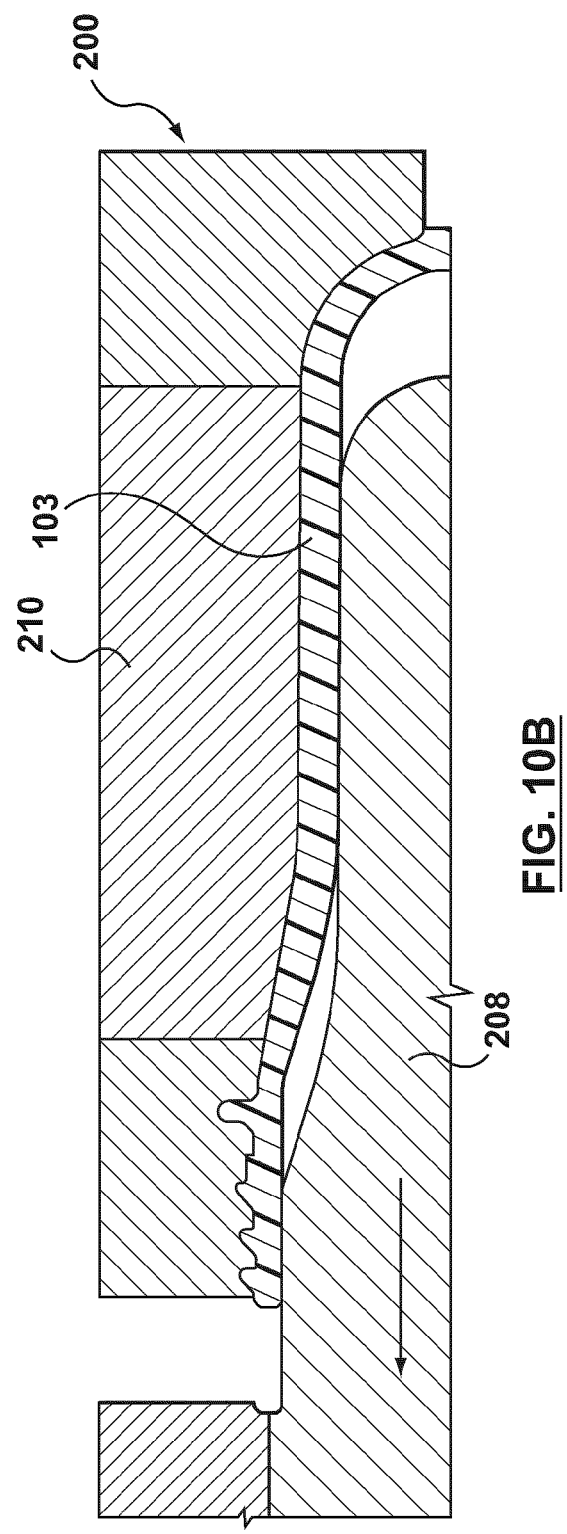

This is illustrated in more detail with reference to FIG. 10A and FIG. 10B, in which FIG. 10A depicts a schematic representation of the mold-cavity system 200 having the molded article 103 with its molecules being in a position relative to the core portion 208 which can be generally called "positioning during the process cycle" and FIG. 10B depicts a schematic representation of the mold-cavity system 200 having the molded article 103 after the core portion 208 has been moved away from the cavity portion 210 by a distance sufficient to displace the totality of molecules of the plastic of the molded article 103 that abut with the core portion 208 from their relative positioning during the process cycle, the displacement being in substantially the same direction (this direction of displacement being right-bound as viewed in FIG. 10B). It is noted that within this illustration, the mold-cavity system 200 has been effectively opened relative to what was referred before as the "secondary parting line". However, this needs not be so in every embodiment of the present invention. For example, in alternative embodiments of the present invention, the mold-cavity system 200 can be opened similarly to the illustration in FIGS. 5A and 5B.

Effectively, by executing this movement, a part pre-eject function can be executed, while the molded article 103 maintains most contact with the cavity portion 210 and the neck portion 206. A specific technical effect attributable to these embodiments of the present invention may include avoidance of part defect known as "rolled necks" (which is a name used for certain deformations to the neck finish of the molded article 103), due at least partially to executing the pre-eject function while maintaining the contact between the molded article 103 and the neck portion 206.

Within these embodiments of the present invention, the exact magnitude of the travel distance will depend on several parameters, such as for example, the inside draft angle associated with the molded article 103, i.e. the draft angle on the inner skin that abuts with the core portion 208.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is protected by way of letters patent is limited only by the scope of the following claims:

What is claimed is:

1. A molding system being configured to manufacture a molded article in a mold-cavity system by using a molding material, the molding system comprising:
    a pressure-control system being coupled with the mold-cavity system; and
    a controller operatively coupling to the pressure-control system, the controller having a controller-usable memory tangibly embodying a set of controller-executable instructions being configured to direct the controller, the set of controller-executable instructions including:
        mold-unpack instructions, including instructing the controller to control the pressure-control system to reduce, after solidification, at least in part, of the molding material being located in a nub region of the mold-cavity system, internal pressure of the molding material received in the mold-cavity system while the mold-cavity system remains isolated from a stream of flowable-molding material, beyond any reduction of the internal pressure in the molding material resulting from cooling of the molding material, so that the reduction in the internal pressure of the molding material is enough to permit safe opening of the mold-cavity system while permitting safe extraction of the molded article from the mold-cavity system.

2. A molding system being configured to manufacture a molded article by using a mold-cavity system and using a molding material, the molding system comprising:
   a group of controllable systems, including:
      a mold-cooling system being configured to couple with the mold-cavity system;
      a pressure-control system being configured to couple with the mold-cavity system;
      a melt-preparation system being configured to couple with the mold-cavity system; and
   a controller being operatively coupling to the group of controllable systems, the controller having a controller-usable memory tangibly embodying a set of controller-executable instructions being configured to direct the controller to control operation of the molding system, the set of controller-executable instructions including:
      melt-stream disconnection instructions, instructing the controller to control the melt-preparation system to disconnect the mold-cavity system from a stream of flowable-molding material, so that the mold-cavity system becomes isolated from the stream of flowable-molding material after the mold-cavity system has received a portion of the stream of flowable-molding material;
      heat-reduction instructions, instructing the controller to control the mold-cooling system to remove heat from the molding material being received in the mold-cavity system after the mold-cavity system has been disconnected from the stream of flowable-molding material so that the mold-cavity system becomes isolated from the stream of flowable-molding material, and in response solidification of the molding material occurs in a gate portion of the mold-cavity system so that the molded article may be removed from the mold-cavity system; and
      mold-unpack instructions, including instructing the controller to control the pressure-control system to reduce, after solidification, at least in part, of the molding material being located in a nub region of the mold-cavity system, internal pressure of the molding material received in the mold-cavity system while the mold-cavity system remains isolated from the stream of flowable-molding material, beyond any reduction of the internal pressure in the molding material resulting from cooling of the molding material, so that the reduction in the internal pressure of the molding material is enough to permit safe opening of the mold-cavity system while permitting safe extraction of the molded article from the mold-cavity system.

3. The molding system of claim 2, wherein:
   the set of controller-executable instructions further include:
      mold-pack instructions, instructing the controller to control any one of: (i) the melt-preparation system, and (ii) the melt-preparation system and the pressure-control system to reduce a pressure to the molding material being contained in the mold-cavity system while the molding material becomes cooled, at least in part, in the mold-cavity system;
   the mold-pack instructions include:
      hold instructions, instructing the controller to control the molding system to apply and hold the pressure to the molding material being contained in the mold-cavity system while the molding material remains in a semi-solid state in the mold-cavity system; and
      compensation instructions, instructing the controller to control the molding system to inject an additional amount of the molding material into the mold-cavity system while the molding material in the mold-cavity system remains in the semi-solid state, and the additional amount of the molding material compensating for shrinkage of the molding material being received in the mold-cavity system;
   the melt-stream disconnection instructions are executed:
      (i) after the mold-pack instructions are executed so that the mold-cavity system becomes isolated from the stream of flowable-molding material, and (ii) before the mold-unpack instructions are executed; and
   the mold-unpack instructions further include:
      mold-volume increase instructions, instructing the controller to control the pressure-control system to increase a volume of a mold cavity of the mold-cavity system, the mold cavity receiving the molding material, increasing the volume of the mold cavity reduces the pressure within the molding material being received in the mold-cavity system while: (i) the molding material remains in the semi-solid state in the mold-cavity system, and (ii) the mold cavity remains isolated from the stream of the molding material.

4. The molding system of claim 2, wherein:
   the set of controller-executable instructions further include:
      mold-pack instructions, instructing the controller to control any one of: (i) the melt-preparation system, and (ii) the melt-preparation system and the pressure-control system to reduce a pressure to the molding material being contained in the mold-cavity system while the molding material becomes cooled, at least in part, in the mold-cavity system;
   the melt-stream disconnection instructions are executed:
      (i) before the mold-pack instructions are executed, and (ii) before the mold-unpack instructions are executed;
   the mold-pack instructions further include:
      mold-volume reduction instructions, instructing the controller to control the pressure-control system to decrease a volume of a mold cavity of the mold-cavity system, the mold cavity having the molding material, so that an additional pressure is applied to the molding material being received in the mold-cavity system while the molding material remains in a semi-solid state in the mold-cavity system, so that the volume of the mold cavity is reduced and the molding material located in the mold cavity is compressed, so that density of the molding material located in the mold-cavity system increases; and
   the mold-unpack instructions further include:
      mold-volume increase instructions, instructing the controller to control the pressure-control system to increase the volume of the mold cavity, so that the internal pressure of the molding material being contained in the mold-cavity system is reduced while the molding material remains in the semi-solid state in the mold-cavity system, so that the molding material located in the mold-cavity system becomes decompressed and the density of the molding material decreases by expanding the volume of the mold cavity before the mold-cavity system is opened sufficiently so as to remove the molded article and while the mold-cavity system remains isolated from the stream of the molding material.

5. A molding system being configured to manufacture a molded article by using a mold-cavity system and using a molding material, the mold-cavity system having a stationary-mold assembly and a movable-mold assembly, the molding system comprising:

a hot-runner system being coupled with the stationary-mold assembly;
a stationary platen being configured to support the hot-runner system and the stationary-mold assembly;
a movable platen being configured to support the movable-mold assembly, and being movable relative to the stationary platen;
platen bars operatively extending between the stationary platen and the movable platen;
a group of controllable systems, including:
  a platen actuator being coupled with the movable platen;
  bar locks lockably coupling the platen bars with the movable platen;
  clamp assemblies being coupled with the platen bars, the clamp assemblies being configured to apply a clamp tonnage to the platen bars;
  a mold-cooling system being configured to couple with the mold-cavity system;
  a pressure-control system being configured to couple with the mold-cavity system;
  a melt-preparation system being configured to couple with the mold-cavity system; and
a controller being operatively coupling to the group of controllable systems, the controller having a controller-usable memory tangibly embodying a set of controller-executable instructions being configured to direct the controller to control operation of the molding system, the set of controller-executable instructions including:
  melt-preparation instructions, including instructing the controller to control the melt-preparation system to convert the molding material into a stream of flowable-molding material;
  mold-close instructions, including instructing the controller to control the platen actuator to move the movable platen toward the stationary platen thereby shutting close the mold-cavity system;
  mold-lock instructions, instructing the controller to control the bar locks to lock the movable platen and the platen bars so that the mold-cavity system is locked, so that portions of the mold-cavity system do not move relative to each other when the mold-cavity system is injected, under pressure, with the stream of flowable-molding material;
  tonnage-engage instructions, instructing the controller to control the clamp assemblies to apply the clamp tonnage to the mold-cavity system via the platen bars after the mold-cavity system is closed shut and locked;
  melt-stream connection instructions, instructing the controller to control the melt-preparation system to connect the mold-cavity system to the stream of flowable-molding material, so that the stream of flowable-molding material may flow into the mold-cavity system;
  mold-injection instructions, instructing the controller to control the melt-preparation system to inject a portion of the stream of flowable-molding material into the mold-cavity system while the clamp tonnage maintains the mold-cavity system closed;
  mold-pack instructions, instructing the controller to control any one of: (i) the melt-preparation system, and (ii) the melt-preparation system and the pressure-control system to reduce the pressure to the molding material being contained in the mold-cavity system while the molding material becomes cooled, at least in part, in the mold-cavity system;
  melt-stream disconnection instructions, instructing the controller to control the melt-preparation system to disconnect the mold-cavity system from the stream of flowable-molding material, so that the mold-cavity system becomes isolated from the stream of flowable-molding material after the mold-cavity system has received the portion of the stream of flowable-molding material;
  heat-reduction instructions, instructing the controller to control the mold-cooling system to remove heat from the molding material being received in the mold-cavity system after the mold-cavity system has been disconnected from the stream of flowable-molding material so that the mold-cavity system becomes isolated from the stream of flowable-molding material, and in response solidification of the molding material occurs in a gate portion of the mold-cavity system so that the molded article may be removed from the mold-cavity system;
  mold-unpack instructions, including instructing the controller to control the pressure-control system to reduce, after solidification, at least in part, of the molding material being located in a nub region of the mold-cavity system, internal pressure of the molding material received in the mold-cavity system while the mold-cavity system remains isolated from the stream of flowable-molding material, beyond any reduction of the internal pressure in the molding material resulting from cooling of the molding material, so that the reduction in the internal pressure of the molding material is enough to permit safe opening of the mold-cavity system while permitting safe extraction of the molded article from the mold-cavity system;
  tonnage-disengage instructions, instructing the controller to control the clamp assemblies to disengage the clamp tonnage from the mold-cavity system;
  mold-unlock instructions, instructing the controller to control the bar locks to unlock the movable platen and the platen bars so that the mold-cavity system is unlocked; and
  mold-open instructions, instructing the controller to control the movable platen to away from the stationary platen thereby opening the mold-cavity system, so that a molded part made in the mold-cavity system may be removed from the mold-cavity system.

6. The molding system of claim 5, wherein:
the mold-pack instructions further include:
  hold instructions, instructing the controller to control the molding system to apply and hold the pressure to the molding material being contained in the mold-cavity system while the molding material remains in a semi-solid state in the mold-cavity system; and compensation instructions, instructing the controller to control the molding system to inject an additional amount of the molding material into the mold-cavity system while the molding material in the mold-cavity system remains in the semi-solid state, and the additional amount of the molding material compensating for shrinkage of the molding material being received in the mold-cavity system;

the melt-stream disconnection instructions are executed:
(i) after the mold-pack instructions are executed so that the mold-cavity system becomes isolated from the stream of flowable-molding material, and (ii) before the mold-unpack instructions are executed; and the mold-unpack instructions further include:
mold-volume increase instructions, instructing the controller to control the pressure-control system to increase a volume of a mold cavity of the mold-cavity system, the mold cavity receiving the molding material, increasing the volume of the mold cavity reduces the pressure within the molding material being received in the mold-cavity system while: (i) the molding material remains in the semi-solid state in the mold-cavity system, and (ii) the mold cavity remains isolated from the stream of the molding material.

7. The molding system of claim 5, wherein:
the melt-stream disconnection instructions are executed:
(i) before the mold-pack instructions are executed, and
(ii) before the mold-unpack instructions are executed;

the mold-pack instructions further include:
mold-volume reduction instructions, instructing the controller to control the pressure-control system to decrease a volume of a mold cavity of the mold-cavity system, the mold cavity having the molding material, so that additional pressure is applied to the molding material being received in the mold-cavity system while the molding material remains in a semi-solid state in the mold-cavity system, so that the volume of the mold cavity is reduced and the molding material located in the mold cavity is compressed, so that density of the molding material located in the mold-cavity system increases; and the mold-unpack instructions further include:
mold-volume increase instructions, instructing the controller to control the pressure-control system to increase the volume of the mold cavity, so that the internal pressure of the molding material being contained in the mold-cavity system is reduced while the molding material remains in the semi-solid state in the mold-cavity system, so that the molding material located in the mold-cavity system becomes decompressed and the density of the molding material decreases by expanding the volume of the mold cavity before the mold-cavity system is opened sufficiently so as to remove the molded article and while the mold-cavity system remains isolated from the stream of the molding material.

8. A controller for use with a molding system being configured to manufacture a molded article in a mold-cavity system by using a molding material, the molding system including a group of controllable systems including a pressure-control system being: (i) coupled with the mold-cavity system, and (ii) being operatively coupled to the group of controllable systems, the controller comprising:

a controller-usable memory tangibly embodying a set of controller-executable instructions being configured to direct the controller to control operation of the molding system, the set of controller-executable instructions including:
mold-unpack instructions, including instructing the controller to control the pressure-control system to reduce, after solidification, at least in part, of the molding material being located in a nub region of the mold-cavity system, internal pressure of the molding material received in the mold-cavity system while the mold-cavity system remains isolated from a stream of flowable-molding material, beyond any reduction of the internal pressure in the molding material resulting from cooling of the molding material, so that the reduction in the internal pressure of the molding material is enough to permit safe opening of the mold-cavity system while permitting safe extraction of the molded article from the mold-cavity system.

9. A controller-usable memory for use with a controller, the controller for use with a molding system being configured to manufacture a molded article in a mold-cavity system by using a molding material, the molding system including a group of controllable systems including a pressure-control system being: (i) coupled with the mold-cavity system, and (ii) being operatively coupled to the group of controllable systems, the controller-usable memory comprising:

a set of controller-executable instructions being tangibly embodied in the controller-usable memory, and being configured to direct the controller to control operation of the molding system, the set of controller-executable instructions including:
mold-unpack instructions, including instructing the controller to control the pressure-control system to reduce, after solidification, at least in part, of the molding material being located in a nub region of the mold-cavity system, internal pressure of the molding material received in the mold-cavity system while the mold-cavity system remains isolated from a stream of flowable-molding material, beyond any reduction of the internal pressure in the molding material resulting from cooling of the molding material, so that the reduction in the internal pressure of the molding material is enough to permit safe opening of the mold-cavity system while permitting safe extraction of the molded article from the mold-cavity system.

* * * * *